United States Patent
Gupta

(10) Patent No.: US 11,558,324 B2
(45) Date of Patent: Jan. 17, 2023

(54) METHOD AND SYSTEM FOR DYNAMICALLY GENERATING A CARD

(71) Applicant: YAHOO ASSETS LLC, Dulles, VA (US)

(72) Inventor: Abhay Gupta, Los Altos, CA (US)

(73) Assignee: YAHOO ASSETS LLC, Dulles, VA (US)

(*) Notice: Subject to any disclaimer, the term of this patent is extended or adjusted under 35 U.S.C. 154(b) by 0 days.

(21) Appl. No.: 16/797,335

(22) Filed: Feb. 21, 2020

(65) Prior Publication Data

US 2020/0195594 A1 Jun. 18, 2020

Related U.S. Application Data

(63) Continuation of application No. 14/874,598, filed on Oct. 5, 2015, now Pat. No. 10,601,747.

(51) Int. Cl.
*H04L 51/10* (2022.01)

(52) U.S. Cl.
CPC .................... *H04L 51/10* (2013.01)

(58) Field of Classification Search
CPC ... G06Q 50/01; G06F 17/3053; G06F 3/0482; G06F 17/30554; G06F 17/30867; G06F 3/04842; G06F 17/30864; H04L 67/22
See application file for complete search history.

(56) References Cited

U.S. PATENT DOCUMENTS

| | | | |
|---|---|---|---|
| 8,812,528 B1* | 8/2014 | Pedregal | G06Q 50/01 707/769 |
| 8,938,690 B1 | 1/2015 | Khouri et al. | |
| 8,949,250 B1* | 2/2015 | Garg | G06F 16/248 707/751 |
| 8,954,469 B2 | 2/2015 | Dhillon et al. | |
| 9,176,639 B1* | 11/2015 | Barros | G06F 3/0483 |
| 9,274,683 B2* | 3/2016 | Fey | G06F 16/9577 |
| 9,438,646 B2* | 9/2016 | Andler | G06Q 50/01 |
| 9,491,522 B1* | 11/2016 | Trollope | H04N 21/436 |
| 9,602,559 B1* | 3/2017 | Barros | H04L 65/403 |
| 9,654,598 B1* | 5/2017 | Crawford | H04W 4/023 |
| 2010/0188421 A1* | 7/2010 | Ohwa | G06F 16/58 707/E17.014 |
| 2010/0299194 A1* | 11/2010 | Snyder | G06Q 30/0603 705/14.23 |
| 2012/0059838 A1* | 3/2012 | Berntson | G06F 16/951 707/E17.014 |
| 2013/0066922 A1 | 3/2013 | Jang et al. | |
| 2013/0185322 A1 | 7/2013 | Vegh | |

(Continued)

OTHER PUBLICATIONS

International Preliminary Report on Patentability dated Apr. 19, 2018 in International Application PCT/US2016/054172.

(Continued)

*Primary Examiner* — Shean Tokuta
(74) *Attorney, Agent, or Firm* — Venable LLP

(57) ABSTRACT

The present teaching relates to dynamically generating a card. In one example, a request is received for generating a card to be provided to a user. Dynamic information related to the request is obtained. One or more modules are selected to be put into the card based on the dynamic information. The card is generated based on the selected one or more modules.

20 Claims, 28 Drawing Sheets

(56) References Cited

U.S. PATENT DOCUMENTS

| | | | |
|---|---|---|---|
| 2013/0283194 A1* | 10/2013 | Kopp | G07F 17/3209 715/764 |
| 2014/0067901 A1* | 3/2014 | Shaw | G06Q 10/10 709/201 |
| 2014/0089819 A1* | 3/2014 | Andler | G06F 3/04842 715/753 |
| 2014/0149518 A1 | 5/2014 | Zhao | |
| 2014/0249897 A1* | 9/2014 | Znerold | G06Q 30/0241 705/14.4 |
| 2014/0249912 A1* | 9/2014 | Znerold | G06Q 30/0242 705/14.41 |
| 2014/0297655 A1* | 10/2014 | Paglia | H04L 67/535 709/204 |
| 2014/0344288 A1* | 11/2014 | Evans | G06F 16/954 707/749 |
| 2014/0372539 A1* | 12/2014 | Zaveri | H04L 51/52 709/206 |
| 2014/0372864 A1* | 12/2014 | Zaragoza | G06F 16/9535 715/234 |
| 2015/0106737 A1* | 4/2015 | Montoy-Wilson | G06F 9/451 715/745 |
| 2015/0134653 A1* | 5/2015 | Bayer | H04N 21/4826 707/732 |
| 2015/0160806 A1* | 6/2015 | Fey | G06F 16/951 715/748 |
| 2015/0178283 A1* | 6/2015 | Garg | G06Q 50/01 707/754 |
| 2015/0189347 A1* | 7/2015 | Oztaskent | H04N 21/43074 725/32 |
| 2015/0199763 A1* | 7/2015 | Birkhead | G06Q 40/06 705/36 R |
| 2015/0248459 A1* | 9/2015 | Miller | G06F 16/2455 707/769 |
| 2015/0302338 A1* | 10/2015 | Zaveri | H04L 67/1001 705/7.39 |
| 2015/0324271 A1* | 11/2015 | Glass | G06F 16/437 707/706 |
| 2015/0324361 A1* | 11/2015 | Glass | G06F 16/24578 707/748 |
| 2015/0370435 A1* | 12/2015 | Kirmse | H04N 21/8133 715/716 |
| 2016/0055160 A1* | 2/2016 | Himel | G06F 16/248 707/728 |
| 2016/0070764 A1* | 3/2016 | Helvik | G06F 16/24575 707/734 |
| 2016/0077673 A1* | 3/2016 | Nagaralu | G06F 9/451 715/748 |
| 2016/0092404 A1* | 3/2016 | Farouki | G06F 9/451 715/202 |
| 2016/0104067 A1* | 4/2016 | Xu | H04L 67/306 706/46 |
| 2016/0105479 A1* | 4/2016 | McFarland | G06F 40/186 709/219 |
| 2016/0125559 A1* | 5/2016 | Shekou | G06Q 50/01 705/6 |
| 2017/0024393 A1* | 1/2017 | Choksi | G06F 3/0485 |
| 2017/0068693 A1* | 3/2017 | Macksood | G06F 16/9562 |
| 2017/0099242 A1* | 4/2017 | Gupta | H04L 51/10 |
| 2017/0228114 A1* | 8/2017 | Brett | G06F 16/9535 |
| 2020/0195594 A1* | 6/2020 | Gupta | H04L 51/10 |

OTHER PUBLICATIONS

International Search Report and Written Opinion dated Dec. 13, 2016 in International Application PCT/US2016/054172.

* cited by examiner

METHOD AND SYSTEM FOR DYNAMICALLY GENERATING A CARD

CROSS-REFERENCE TO RELATED APPLICATION

The present application is a continuation of U.S. patent application Ser. No. 14/874,598, filed Oct. 5, 2015, which is incorporated herein by reference in its entirety.

The present application is related to U.S. patent application Ser. No. 14/874,627, now U.S. Pat. No. 9,767,400, filed Oct. 5, 2015, entitled METHOD AND SYSTEM FOR GENERATING A CARD BASED ON INTENT, which is incorporated herein by reference in its entirety.

BACKGROUND

Technical Field

The present teaching generally relates to organizing, retrieving, presenting, and utilizing information. Specifically, the present teaching relates to methods and systems for dynamically generating a card.

Discussion of Technical Background

The Internet has made it possible for a person to electronically access virtually any content at any time and from any location. The Internet technology facilitates information publishing, information sharing, and data exchange in various spaces and among different persons. One problem associated with the rapid growth of the Internet is the so-called "information explosion," which is the rapid increase in the amount of available information and the effects of this abundance. As the amount of available information grows, the problem of managing the information becomes more difficult, which can lead to information overload. With the explosion of information, it has become more and more important to provide users with information from a public space that is relevant to the individual person and not just information in general.

In addition to the public space such as the Internet, semi-private spaces including social media and data sharing sites have become another important source where people can obtain and share information in their daily lives. The continuous and rapid growth of social media and data sharing sites in the past decade has significantly impacted the lifestyles of many; people spend more and more time on chatting and sharing information with their social connections in the semi-private spaces or use such semi-private sources as additional means for obtaining information and entertainment. Similar to what has happened in the public space, information explosion has also become an issue in the social media space, especially in managing and retrieving information in an efficient and organized manner.

Private space is another data source used frequently in people's everyday lives. For example, personal emails in Yahoo! mail, Gmail, Outlook etc. and personal calendar events are considered as private sources because they are only accessible to a person when she or he logs in using private credentials. Although most information in a person's private space may be relevant to the person, it is organized in a segregated manner. For example, a person's emails may be organized by different email accounts and stored locally in different email applications or remotely at different email servers. As such, to get a full picture of some situation related to, e.g., some event, a person often has to search different private spaces to piece everything together. For example, to check with a friend of the actual arrival time for a dinner, one may have to first check a particular email (in the email space) from the friend indicating the time the friend will arrive, and then go to Contacts (a different private space) to search for the friend's contact information before making a call to the friend to confirm the actual arrival time. This is not convenient.

The segregation of information occurs not only in the private space, but also in the semi-private and public spaces. This has led to another consequential problem given the information explosion: requiring one to constantly look for information across different segregated spaces to piece everything together due to lack of meaningful connections among pieces of information that are related in actuality yet isolated in different segregated spaces.

Efforts have been made to organize the huge amount of available information to assist a person to find the relevant information. Conventional scheme of such effort is application-centric and/or domain-centric. Each application carves out its own subset of information in a manner that is specific to the application and/or specific to a vertical or domain. For example, such attempt is either dedicated to a particular email account (e.g., www.Gmail.com) or specific to an email vertical (e.g., Outlook); a traditional web topical portal allows users to access information in a specific vertical, such as www.IMDB.com in the movies domain and www.ESPN.com in the sports domain. In practice, however, a person often has to go back and forth between different applications, sometimes across different spaces, in order to complete a task because of the segregated and unorganized nature of information existing in various spaces. Moreover, even within a specific vertical, the enormous amount of information makes it tedious and time consuming to find the desired information.

Another line of effort is directed to organizing and providing information in an interest-centric manner. For example, user groups of social media in a semi-private space may be formed by common interests among the group members so that they can share information that is likely to be of interest to each other. Web portals in the public space start to build user profiles for individuals and recommend content based on an individual person's interests, either declared or inferred. The effectiveness of interest-centric information organization and recommendation is highly relied on the accuracy of user profiling. Oftentimes, however, a person may not like to declare her/his interests, whether in a semi-private space or a public space. In that case, the accuracy of user profiling can only be relied on estimation, which can be questionable. Accordingly, neither of the application-centric, domain-centric, and interest-centric ways works well in dealing with the information explosion challenge.

FIG. 1 depicts a traditional scheme of information organization and retrieval in different spaces in a segregated and disorganized manner. A person 102 has to interact with information in private space 104, semi-private space 106, and public space 108 via unrelated and separate means 110, 112, 114, respectively. For accessing private data from the private space 104, means 110, such as email applications, email sites, local or remote Contacts and calendars, etc., has to be selected and used. Each means 110 is domain or application-oriented, allowing the person 102 to access information related to the domain with the specific application that the means 110 is developed for. Even for information residing within different applications/domains in the private space 104, a person 102 still has to go by different means 110 to access content of each application/domain, which is not convenient and not person-centric. For example, in order to find out the phone numbers of attendees of a birthday party, the person 102 has to first find all the confirmation emails from the attendees (may be sent in different emails and even to different email accounts), write down each name, and open different Contacts to look for their phone numbers.

Similarly, for interacting with the semi-private space 106, a person 102 needs to use a variety of means 112, each of which is developed and dedicated for a specific semi-private data source. For example, Facebook desktop application, Facebook mobile app, and Facebook site are all means for accessing information in the person 102's Facebook account. But when the person 102 wants to open any document shared on Dropbox by a Facebook friend, the person 102 has to switch to another means dedicated to Dropbox (a desktop application, a mobile app, or a website). As shown in FIG. 1, information may be transmitted between the private space 104 and the semi-private space 106. For instance, private photos can be uploaded to a social media site for sharing with friends; social media or data sharing sites may send private emails to a person 102's private email account notifying her/him of status updates of social friends. However, such information exchange does not automatically create any linkage between data between the private and semi-private spaces 104, 106. Thus, there is no application that can keep track of such information exchange and establish meaningful connections, much less utilizing the connections to make it easier to search for information.

As to the public space 108, means 114 such as traditional search engines (e.g., www.Google.com) or web portals (e.g., www.CNN.com, www.AOL.com, www.IMDB.com, etc.) are used to access information. With the increasing challenge of information explosion, various efforts have been made to assist a person 102 to efficiently access relevant and on-the-point content from the public space 108. For example, topical portals have been developed that are more domain-oriented as compared to generic content gathering systems such as traditional search engines. Examples include topical portals on finance, sports, news, weather, shopping, music, art, movies, etc. Such topical portals allow the person 102 to access information related to subject matters that these portals are directed to. Vertical search has also been implemented by major search engines to help to limit the search results within a specific domain, such as images, news, or local results. However, even if limiting the search result to a specific domain in the public space 108, there is still an enormous amount of available information, putting much burden on the person 102 to identify desired information.

There is also information flow among the public space 108, the semi-private space 106, and the private space 104. For example, www.FedeEx.com (public space) may send a private email to a person 102's email account (private space) with a tracking number; a person 102 may include URLs of public websites in her/his tweets to followers. However, in reality, it is easy to lose track of related information residing in different spaces. When needed, much effort is needed to dig them out based on memory via separate means 110, 112, 114 across different spaces 104, 106, 108. In today's society, this consumes more and more people's time.

Because information residing in different spaces or even within the same space is organized in a segregated manner and can only be accessed via dedicated means, the identification and presentation of information from different sources (whether from the same or different spaces) cannot be made in a coherent and unified manner. For example, when a person 102 searches for information using a query in different spaces, the results yielded in different search spaces are different. For instance, search result from a conventional search engine directed to the public space 108 is usually a search result page with "blue links," while a search in the email space based on the same query will certainly look completely different. When the same query is used for search in different social media applications in the semi-private space 106, each application will again likely organize and present the search result in a distinct manner. Such inconsistency affects user experience. Further, related information residing in different sources is retrieved piece meal so that it requires the person 102 to manually connect the dots provide a mental picture of the overall situation.

Therefore, there is a need for improvements over the conventional approaches to organize, retrieve, present, and utilize information.

SUMMARY

The present teaching relates to methods, systems, and programming for dynamically generating a card.

In one example, a method, implemented on a machine having at least one processor, storage, and a communication platform capable of connecting to a network for generating a card is disclosed. A request is received for generating a card to be provided to a user. Dynamic information related to the request is obtained. One or more modules are selected to be put into the card based on the dynamic information. The card is generated based on the selected one or more modules.

In a different example, a system having at least one processor, storage, and a communication platform connected to a network for generating a card is disclosed. The system comprises a card type determiner configured for receiving a request for generating a card to be provided to a user; a data retriever configured for obtaining dynamic information related to the request; a card module determiner configured for selecting one or more modules to be put into the card based on the dynamic information; and a card constructor configured for generating the card based on the selected one or more modules.

Other concepts relate to software for implementing the present teaching on dynamically generating a card. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for generating a card is disclosed. The information, when read by the machine, causes the machine to perform the following. A request is received for generating a card to be provided to a user. Dynamic information related to the request is obtained. One or more modules are selected to be put into the card based on the dynamic information. The card is generated based on the selected one or more modules.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

The present teaching describes methods, systems, and programming aspects of efficiently and effectively organizing, retrieving, presenting, and utilizing information.

Figure 1:
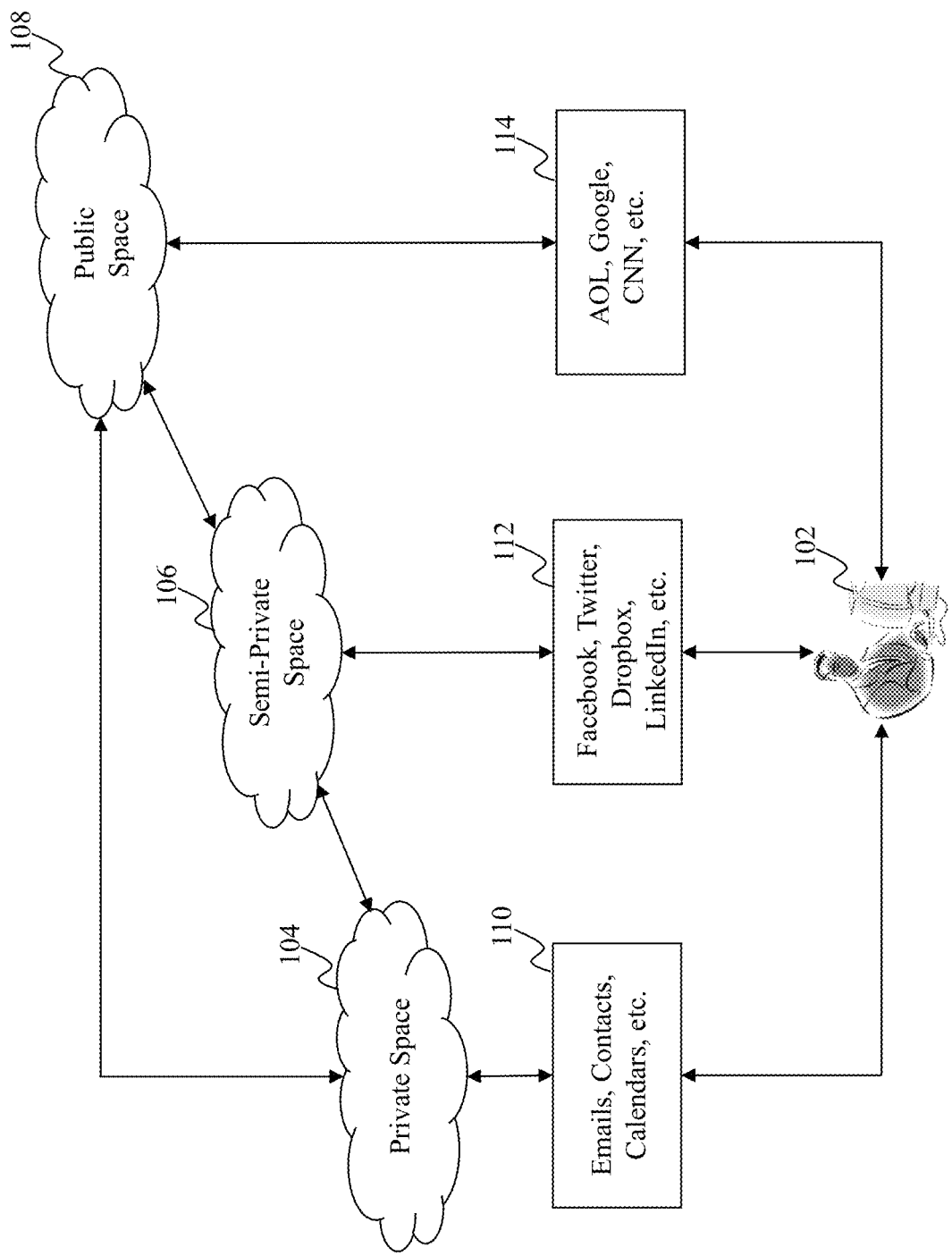
FIG. 1 (prior art) depicts a traditional scheme of information organization and retrieval from different spaces in a segregated and disorganized manner.
Figure 2:
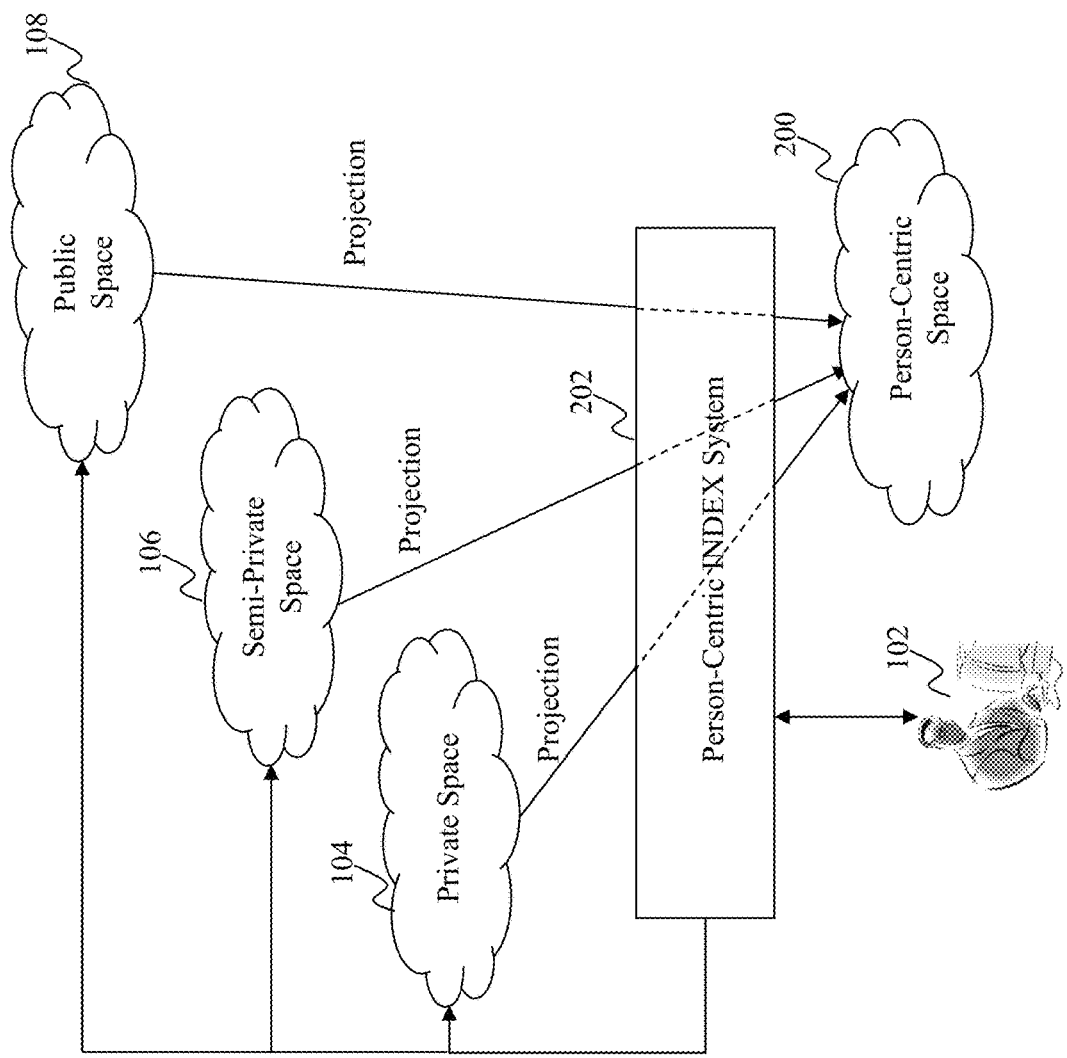
FIG. 2 depicts a novel scheme of building a person-centric space for a person by cross-linking data from different spaces and applications thereof, according to an embodiment of the present teaching.

FIG. 2 depicts a novel scheme of building a person-centric space 200 for a person 102 by cross-linking data from different spaces and applications thereof, according to an embodiment of the present teaching. Unlike the traditional approach to organize information in different spaces in a segregated and disorganized manner, as illustrated in FIG. 1, FIG. 2 provides a person-centric INDEX system 202, which builds the person-centric space 200 specific to the person 102 by digesting information from the public space 108, semi-private space 106, and private space 104 and cross-linking relevant data from those spaces 104, 106, 108. As described herein, a person 102 referred herein may include a human being, a group of people, an organization such as a business department or a corporation, or any unit that can use the person-centric INDEX system 202. A space, whether private, semi-private, or public, may be a collection of information in one or more sources. Through the person-centric INDEX system 202, information relevant to the person 102 from each of the private, semi-private, and public spaces 104, 106, and 108 is projected, into the person-centric space 200 in a meaningful manner. That is, a part of the data in the person-centric space 200 is projected from the public space 108 in a manner relevant to the person 102; a part of the data in the person-centric space 200 is projected from the semi-private space 106 in a manner relevant to the person 102; a part of the data in the person-centric space 200 is projected from the private space 104. Thus, the person-centric space 200 is an information universe meaningful to the person 102 and formed from the perspective of the person 102.

Different from conventional approaches, which organize information in an application-centric, domain-centric, or interest-centric manner, the person-centric INDEX system 202 recognizes relevant information from the enormous information available in the public space 108, semi-private space 106, and private space 104 in accordance with the perspective of the person 102, thereby filtering out information that is not relevant to the person 102, assisting the person 102 to make sense out of the relevance among different pieces of information in the person-centric space. The person-centric space 200 is dynamic and changes with the online (possibly offline) activities of the person 102. For example, the person 102 can search more content via the person-centric INDEX system 202 (this function may be similar to conventional search engine) that will lead to the continuously expansion of the person-centric space 200. The person-centric INDEX system 202 can cross-link data across information different spaces, or information from different sources in the same space. For instance, by identifying a FedEx tracking number in an order confirmation email sent to a personal email account from www.Amazon.com, the person-centric INDEX system 202 can automatically search for any information in any space that is relevant to the tracking number, such as package delivery status information from www.FedEx.com in the public space 108. Although most information from www.FedEx.com may not be related to the person 102, the particular package delivery status information relevant to the person 102 and can be retrieved by the person-centric INDEX system 202 and indexed against the information from the person 102's private emails. In other words, the package delivery status information, even though from the public space 108, can be projected into the person-centric space 200 and, together with other information in the person-centric space 200 (such as a confirmation email related to the package), the person-centric INDEX system 202 integrates relevant information from different sources to yield unified and semantically meaningful information, such as a card related to an order incorporating the name of the ordered item, the name of the person who ordered it, the name of the company that is to deliver the item, as well as the current delivery status.

In another example, when a private email reminding of an upcoming soccer game from a coach is received, the person-centric INDEX system 202 may be triggered to process the private email and identify, based on the content of the email, certain information in the sports domain such as date/time, location, and players and coaches of the soccer game and cross link the email with such information. The person-centric INDEX system 202 may also retrieve additional relevant information from other data sources, such as phone number of the coach from Contacts of the person 102. The person-centric INDEX system 202 may also retrieve map and directions to the soccer game stadium from Google Maps based on the location information and retrieve weather forecast of the game from www.Weather.com based on the date. If the coach is connected with the person 102 in any social media, then the person-centric INDEX system 202 may go to the social media site in the semi-private space 106 to retrieve any content made by the coach that is relevant to the soccer game. In this example, all those different pieces of information from the public space 108, semi-private space 106, and private space 104 are cross-linked and projected to the person-centric space 200 in accordance with the person 102's perspective on the soccer game.

The person-centric INDEX system 202 may build the initial person-centric space 200 when the person 102 first time accesses the person-centric INDEX system 202. By analyzing all the information in the private space 104 which the person 102 has granted access permission, the person-centric INDEX system 202 can identify, retrieve, and link relevant information from the public space 108, semi-private space 106, and private space 104 and project them into the person-centric space 200. As mentioned above, the person-centric INDEX system 202 also maintains and updates the person-centric space 200 in a continuous or dynamic manner. In one example, the person-centric INDEX system 202 may automatically check any change, either in the private space 104 or otherwise, based on a schedule and initiates the update of the person-centric space 200 when necessary. For example, every two hours, the person-centric INDEX system 202 may automatically check any new email that has not been analyzed before. In another example, the person-centric INDEX system 202 may automatically check any change occurring in the public space 108 and the semi-private space 106 that is relevant to the person 102. For instance, in the soccer game example descried above, every day before the scheduled soccer game, the person-centric INDEX system 202 may automatically check www.Weather.com to see if the weather forecast needs to be updated. The person-centric INDEX system 202 may also update the person-centric space 200 responsive to some triggering event that may affect any data in the person-centric space 200. For example, in the FedEx package example described above, once the scheduled delivery date has passed or a package delivery email has been received, the person-centric INDEX system 202 may update the person-centric space 200 to remove the temporary relationship between the person 102 and www.FedEx.com until a new connection between them is established again in the future. The triggering event is not limited to events happening in the public space 108, semi-private space 106, or private space 104, but can include any internal operation of the person-centric INDEX system 202. As an example, every time the person-centric INDEX system 202 performs a search in response to a query or to answer a question, it may also trigger the person-centric INDEX system 202 to update the person-centric space 200 based on, e.g., newly retrieved information related to, e.g., a search result or some answers. When the search result or answers cannot be found in the person-centric space 200, the person-centric INDEX system 202 may also update the person-centric space 200 to include those search results and answers. That is, the person-centric INDEX system 202 may dynamically update the person-centric space 200 in response to any suitable triggering events.

To better understand information in the person-centric space 200 and make it meaningful, the person-centric INDEX system 202 may further build a person-centric knowledge database including person-centric knowledge by extracting and associating data about the person 102 from the person-centric space 200. The person-centric INDEX system 202 can extract entities related to the person 102 and infer relationships between the entities without the person 102's explicit declaration. A person-centric knowledge representation for the person 102 can be created by person-centric INDEX system 202 the based on the entities and relationships. The inference can be based on any information in the person-centric space 200. The knowledge elements that can be inferred or deduced may include the person 102's social contacts, the person 102's relationships with places, events, etc.

In order to construct the person-centric knowledge representation, the person-centric INDEX system 202 may extract entities from content in the person 102's person-centric space 200. These entities can be places like restaurants or places of interest, contact mentions like names, emails, phone numbers or addresses, and events with date, place and persons involved. In addition to extracting these mentions, the person-centric INDEX system 202 can resolve them to what they refer to (i.e. can disambiguate an extracted entity when it may refer to multiple individuals). For example, a word "King" in a private email may refer to a title of a person who is the King of a country or refer to a person's last name. The person-centric INDEX system 202 may utilize any information in the person-centric space 200 to determine what type of entity the word "King" refers to in the email. In addition to determining an entity type for an extracted entity name, the person-centric INDEX system 202 may also determine a specific individual referred to by this entity name. As one instance, a person's first name may refer to different Contacts, and a same restaurant name can refer to several restaurants. The person-centric INDEX system 202 can make use of contextual information and/or textual metadata associated with the entity name in the email to disambiguate such cases, thereby providing a high precision resolution. With the precise disambiguation, the person-centric INDEX system 202 can find right information from unstructured personal data and provide it in a structured way (e.g. in a graph associated with the person 102). In contrast to a conventional personal profile, the person-centric INDEX system 202 generates a single personal graph for an individual to encompass connections, interests, and events associated with the person 102. It can be understood that a person-centric knowledge may also be represented in a format other than a graph.

The person-centric INDEX system 202, in conjunction with the person-centric space 200, may organize related information from different sources and provide the information to a person 102 in a user-friendly, unified presentation style. In addition to providing requested information in any known format, such as hyperlinks on a search results page, the person-centric INDEX system 202 may present information in intent-based cards. Unlike existing entity-based search results cards organizing results based on an entity, the person-centric INDEX system 202 may focus on a person 102's intent to dynamically build a card for the person 102. The intent may be explicitly specified in the query, or estimated based on the context, trending events, or any knowledge derived from the person-centric space 200. Knowing the person 102's intent when the card is created to answer the query, the person-centric INDEX system 202 can provide relevant information on the card. The relevant information may include partial information associated with the entity in the query, and/or additional information from the person-centric space 200 that is related to the person's intent. In the soccer game example descried above, in response to the person's query or question related to the soccer game, the person-centric INDEX system 202 may estimate the person's intent is to know the date/time of the game and thus, build a card that includes not only the direct answer of the date/time but also other information related to the soccer game in the person-centric space 200, such as the map and directions, weather forecast, and contact information of the coach.

In one embodiment, knowing the current intent of the person 102, the person-centric INDEX system 202 can anticipate the next intent of the person 102, such that the current card provided by the person-centric INDEX system 202 can lead to next steps. For example, the person-centric INDEX system 202 can anticipate that after looking at the show times of a new movie, the person 102 will be likely to buy tickets. In another embodiment, focusing on the person 102's intent, the person-centric INDEX system 202 can answer the person 102 with a card even when there is no entity in the query or request (i.e., in a query-less or anticipatory use case). For example, if the person-centric INDEX system 202 determines that the person 102 has a behavior pattern of searching traffic information from work place to home at 5 pm on workdays, then from now on, the person-centric INDEX system 202 may automatically generate and provide a notice card to the person 102 at around 5 pm on every workday, to notify the person 102 about the traffic information regardless whether a query is received from the person 102.

The person-centric INDEX system 202 can be used for both building the person-centric space 200 for a person 102 and facilitating the person 102 to apply the person-centric space 200 in a variety for applications. Instead of using different means 110, 112, 114 shown in FIG. 1 to access different data sources across different spaces, the person-centric INDEX system 202 can serve as a centralized interface between the person 102 and her/his own person-centric space 200, thereby reducing the time and efforts spent by the person 102 on retrieving desired information or any other applications. As different pieces of relevant information from the public space 108, semi-private space 106, and private space 104 have been projected to the person-centric space 200 in a well-organized way, they can be handled by a single person-centric INDEX system 202, thereby improving the efficiency and effectiveness in finding the desired information. For example, in the FedEx package example described above, any time the person wants to know the current status of the package, she/he no longer needs to dig out the email with the tracking number, write down the tracking number, and open www.FedEx.com in a browser and type in the tracking number. The person-centric INDEX system 202 may have already stored the package delivery status information since the time when the initial order email was received and have kept updating the package delivery status information in the person-centric space 200. So any time when the person 102 inputs a request for package delivery status update, either in the form of a search query or a question n, the person-centric INDEX system 202 can go directly to retrieve the updated package delivery status information from the person-centric space 200 or automatically call the tracking application programing interface (API) of FedEx server with the stored tracking number for the current status update. The result is then provided to the person 102 without any additional efforts made by the person 102. In some embodiments, the person 102 may not even need to explicitly request the status update. Responsive to receiving the order confirmation email, the person-centric INDEX system 202 may automatically set up a task to regularly send the status update to the person 102 until the package is delivered or may dynamically notify the person 102 with any event, like if the package is delayed or lost.

In one aspect of the present teaching, the person-centric INDEX system 202, in conjunction with the person-centric space 200, can be used for answering questions. To achieve this, the person-centric INDEX system 202 may classify a question from a person 102 into a personal question or a non-personal question. In some embodiment, data from the person-centric space 200 may be for classification. For example, a question related to "uncle Sam" may be classified as a personal question if "uncle Sam" is a real person identified from the private Contacts. Once the question is classified as personal, the person-centric INDEX system 202 may extract various features including entities and relationships from the question. The extracted entities and relationships may be used by the person-centric INDEX system 202 to traverse a person-centric knowledge database derived from the person-centric space 200. In some embodiments, the person-centric knowledge database may store data in a triple format including one or more entities and relationships between the one or more entities. When an exact match of relationship and entity are found, an answer is returned. When there is no exact match, a similarity between the question and answer triples is taken into consideration and used to find the candidate answers. In the "uncle Sam" example described above, if the question is "where is uncle Sam," the person-centric INDEX system 202 may search the person-centric knowledge database for any location entity that has a valid relationship with the entity "uncle Sam." In one example, a recent email may be sent by "uncle Sam," and the email may also mention that he will be attending a conference on these days. The location of the conference can be retrieved from the conference website in the public space 108, stored in the person-centric space 200, and associated with entity "uncle Sam." Based on the relationship, the person-centric INDEX system 202 can answer the question with the location of the conference. The person-centric INDEX system 202 thus provides an efficient solution to search for answers to personal questions and increases user engagement and content understanding.

In another aspect of the present teaching, the person-centric INDEX system 202, in conjunction with the person-centric space 200, can be used for task completion. Task completion often involves interactions with different data sources across different spaces. A task such as "making mother's day dinner reservation" involves task actions such as identifying who is my mother, checking what date is mother's day this year, finding out a mutually available time slot on mother's day for my mother and me, picking up a restaurant that my mother and I like, making an online reservation on the restaurant's website, etc. Traditionally, in order to complete each task action, a person 102 has to open a number of applications to access information from different sources across different spaces and perform a series of tedious operations, such as searching for "mother's day 2015" in a search engine, checking my own calendar and mother's shared calendar, digging out past emails about the restaurant reservations for dinners with my mother, making online reservation via a browser, etc. In contrast to the traditional approaches for task completion, the person-centric INDEX system 202 can complete the same task more efficiently and effectively because all pieces of information related to mother's day dinner reservation have already been projected to the person-centric space 200. This makes automatic task generation and completion using the person-centric INDEX system 202 possible. In response to receiving an input of "making mother's day dinner reservation" from a person 102, the person-centric INDEX system 202 can automatically generate the list of task actions as mentioned above and execute each of them based on information from the person-centric space 200 and update the person 102 with the current status of completing the task.

With the dynamic and rich information related to the person 102 that is available in the person-centric space 200, the person-centric INDEX system 202 can even automatically generate a task without any input from the person 102. In one embodiment, anytime a card is generated and provided to the person 102, the information on the card may be analyzed by the person-centric INDEX system 202 to determine whether a task needs to be generated as a follow-up of the card. For example, once an email card summarizing an online order is constructed, the person-centric INDEX system 202 may generate a task to track the package delivery status until it is delivered and notify any status update for the person 102. In another embodiment, any event occurring in the public space 108, semi-private space 106, or private space 104 that is relevant to the person 102 may trigger the task completion as well. For instance, a flight delay message on an airline website in the public space 108 may trigger generation of a task for changing hotel, rental car, and restaurant reservations in the same trip. In still another embodiment, the person 102's past behavior patterns may help the person-centric INDEX system 202 to anticipate her/his intent in the similar context and automatically generate a task accordingly. As an instance, if the person 102 always had a dinner with her/his mother on mother's day at the same restaurant, a task may be generated by the person-centric INDEX system 202 this year, in advance, to make the mother's day dinner reservation at the same restaurant.

It is understood that in some occasions, certain task actions may not be completed solely based on information from the person-centric space 200. For example, in order to complete the task "sending flowers to mom on mother's day," flower shops need to be reached out to. In one embodiment of the present teaching, a task exchange platform may be created to facilitate the completion of tasks. The person-centric INDEX system 202 may send certain tasks or task actions to the task exchange platform so that parties interested in completing the task may make bids on it. The task exchange platform alone, or in conjunction with the person-centric INDEX system 202, may select the winning bid and update the person 102 with the current status of task completion. Monetization of task completion may be achieved by charging service fee to the winning party and/or the person 102 who requests the task.

In still another aspect of the present teaching, the person-centric INDEX system 202, in conjunction with the person-centric space 200, can be used for query suggestions. By processing and analyzing data from the person-centric space 200, the person-centric INDEX system 202 may build a user corpus database, which provides suggestions based on information from the private space 104 and/or semi-private space 106. In response to any input from a person 102, the person-centric INDEX system 202 may process the input and provide suggestions to the person 102 at runtime based on the person 102's relevant private and/or semi-private data from the user corpus database as well other general log-based query suggestion database and search history database. The query suggestions may be provided to the person 102 with very low latency (e.g., less than 10 ms) in response to the person 102's initial input. Further, in some embodiments, before presenting to the person 102, suggestions generated using the person 102's private and/or semi-private data from the user corpus database may be blended with suggestions produced based on general log-based query suggestion database and search history database. Such blended suggestions may be filtered and ranked based on various factors, such as type of content suggested (e.g., email, social media information, etc.), estimated intent based on an immediate previous input from the person 102, context (e.g., location, data/time, etc.) related to the person 102, and/or other factors.

Figure 3:
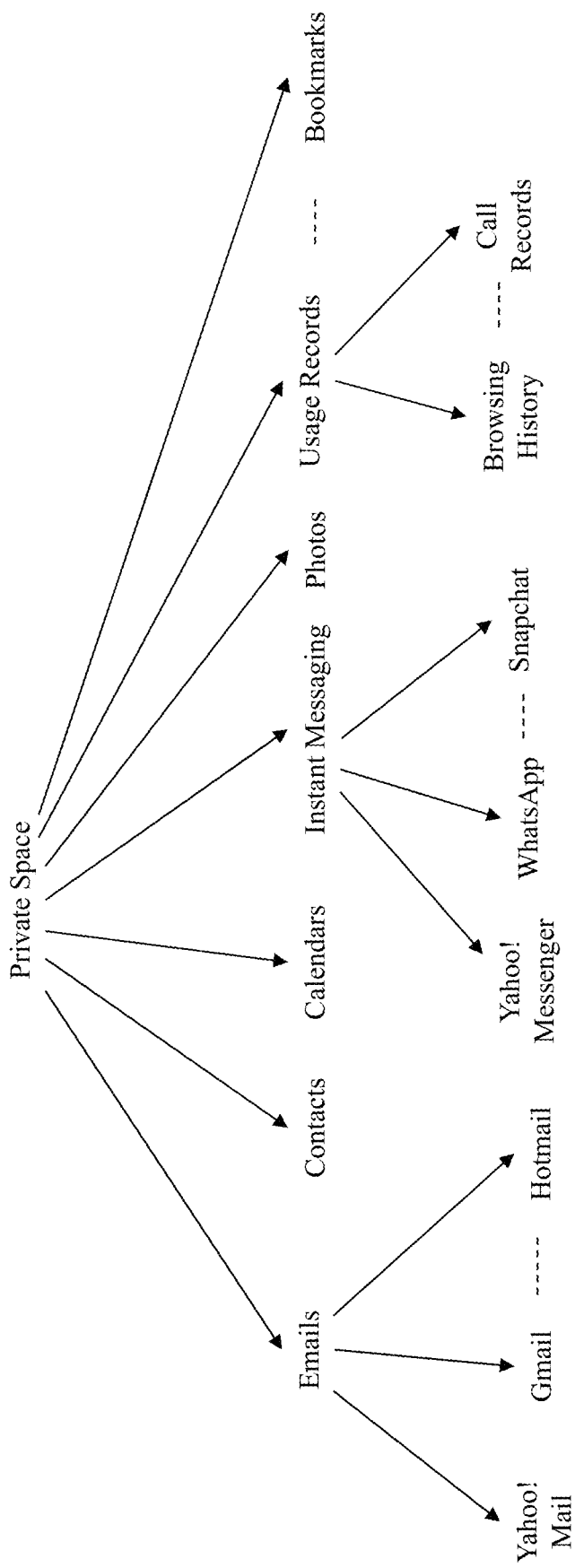
FIG. 3 illustrates exemplary types of data sources in a private space.

FIG. 3 illustrates exemplary types of data sources in a private space. The private space of a person may include any data source that is private to the person. For example, the private space may include any data source that requires access information of the person (e.g., password, token, biometric information, or any user credentials). The private space may also include any data source that is intended to be accessed only by the person even without requiring access control, such as data on a person's smart phone that does not require password or finger print verification. In this illustration, the private space includes several categories of data sources such as emails, Contacts, calendars, instant messaging, photos, usage records, bookmarks, etc. Emails include emails stored in remote email servers such as Yahoo! Mail, Gmail, Hotmail, etc. and local emails in an email application on a personal computer or mobile device. Instant messaging includes any messages communicated between the person 102 and others via any instant messaging applications, for example, Yahoo! Messenger, WhatsApp, Snapchat, to name a few. Usage records may be any logs private to the person, such as, but not limited to, browsing history and call records. It is understood that the examples described above are for illustrative purpose and are not intended to be limiting.

Figure 4:
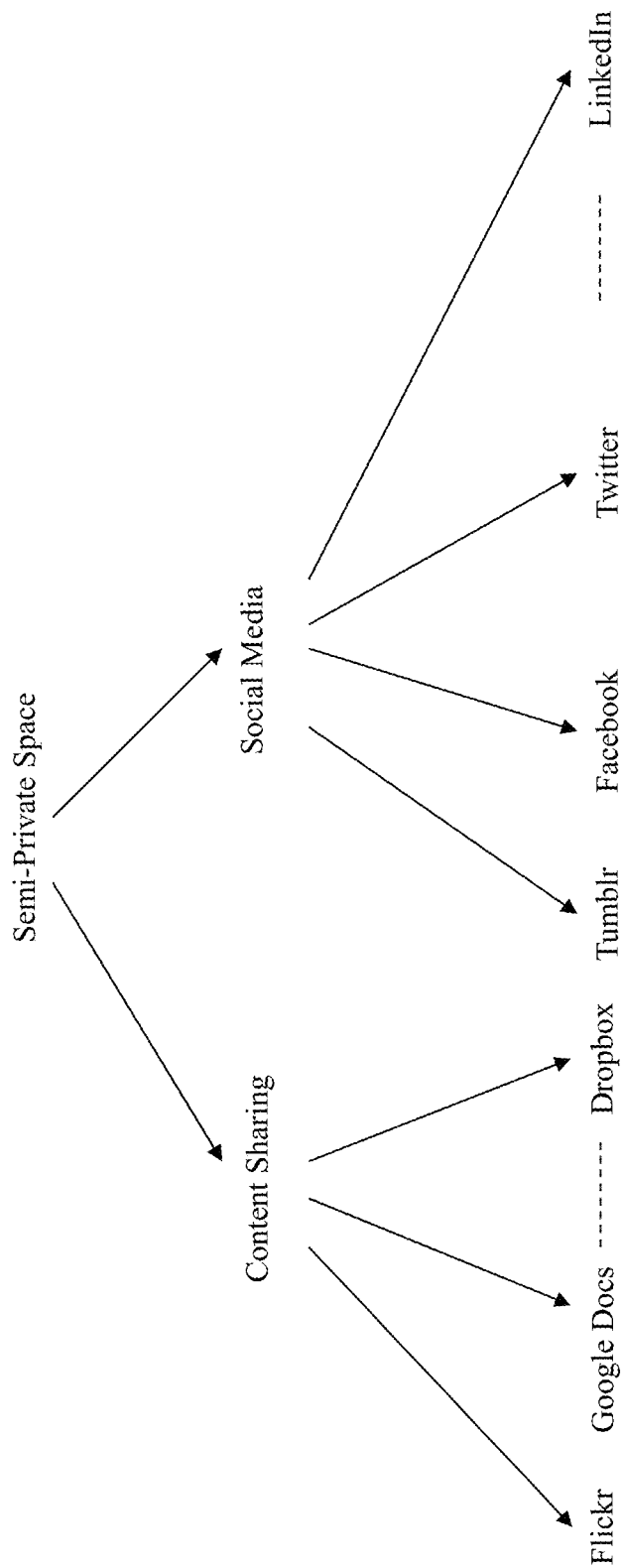
FIG. 4 illustrates exemplary types of data sources in a semi-private space.

FIG. 4 illustrates exemplary types of data sources in a semi-private space. The semi-private space of a person may include any data source that is accessible for a group of people designated by the person. One example of data sources in the semi-private space is social media, such as Tumblr, Facebook, Twitter, LinkedIn, etc. A person can designate a group of people who can access her/his information shared in the social media sites, such as status updates, posts, photos, and comments. Another example of data sources in the semi-private space is a content sharing site. For instance, a person can share photos with family and friends at Flickr, share work documents with colleagues or classmates at Google Docs, and share any files at Dropbox. It is understood that in some cases, there is not a clear boundary between a data source in the private space and a data source in the semi-private space. For instance, if a person restricts photos at Flickr to be only accessible by her/himself, then Flickr becomes a private source of the person, just like local photos stored on the person's device. Similarly, when the entire or a portion of a calendar is shared with others, the calendar becomes part of the semi-private space. It is understood that the examples described above are for illustrative purpose and are not intended to be limiting.

Figure 5:
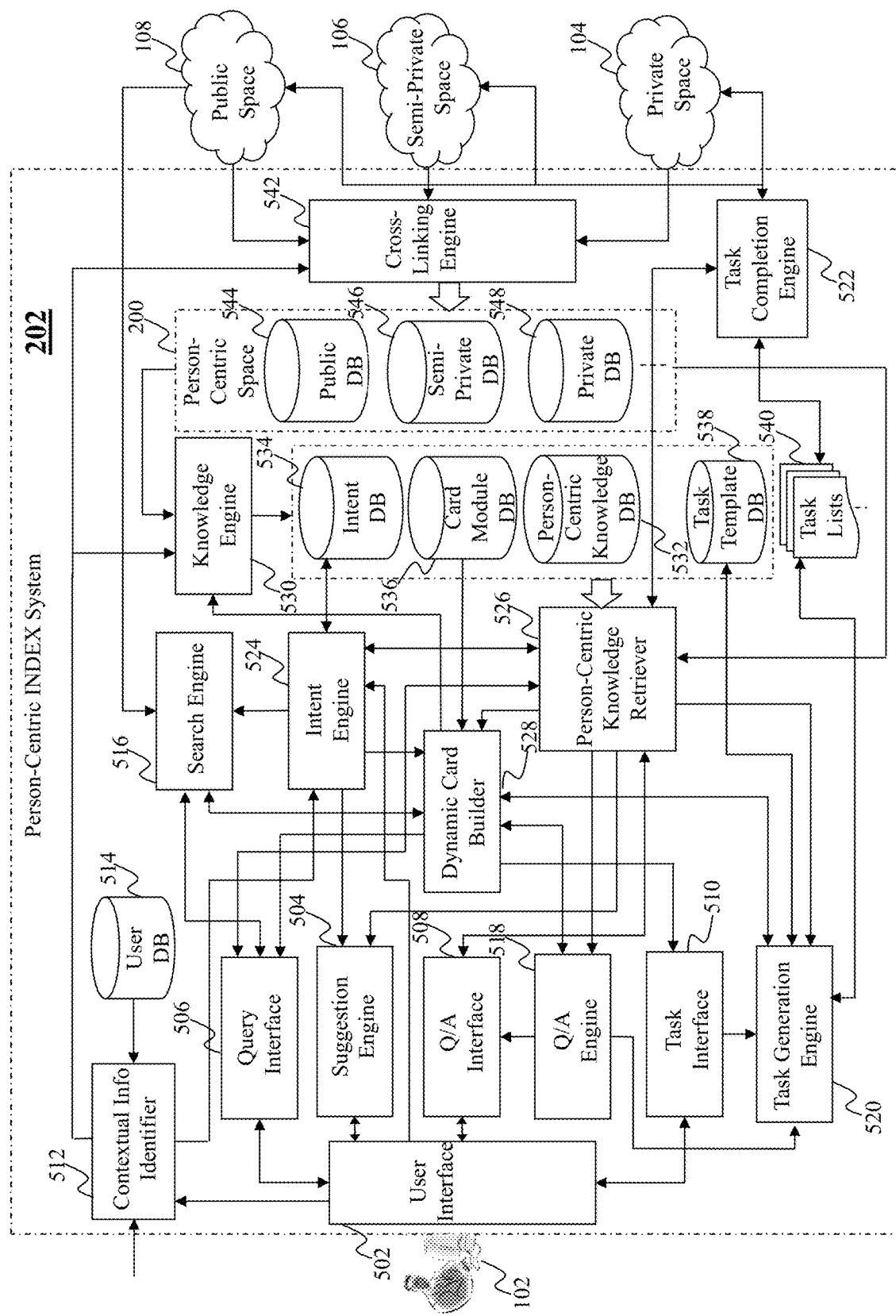
FIG. 5 depicts an exemplary system diagram of a person-centric INDEX system, according to an embodiment of the present teaching.

FIG. 5 depicts an exemplary system diagram of the person-centric INDEX system 202, according to an embodiment of the present teaching. The person-centric INDEX system 202 includes a user interface 502 that connects a person 102 with multiple front-end components including a suggestion engine 504, a query interface 506, a Q/A interface 508, a task interface 510, and a contextual information identifier 512 coupled with a user database 514. To support the front-end components, the person-centric INDEX system 202 further includes multiple functional components including a search engine 516, a Q/A engine 518, a task generation engine 520, a task completion engine 522, an intent engine 524, a person-centric knowledge retriever 526, and a dynamic card builder 528. In the back-end, the person-centric INDEX system 202 includes a variety of databases for storing information in different forms for different purposes, such as the person-centric space 200 having a public database 544, a semi-private database 546, and a private database 548. The person-centric space 200 in this embodiment is built up by a cross-linking engine 542. The person-centric INDEX system 202 further includes a knowledge engine 530 for building a person-centric knowledge database 532 by processing and analyzing information in the person-centric space 200. In addition, additional types of analytic results from the knowledge engine 530 based on data from the person-centric space 200 and/or any other suitable data sources may be stored in an intent database 534, a card module database 536, and a task template database 538.

A person 102 may interact with the person-centric INDEX system 202 via the user interface 502 by providing an input. The input may be made by, for example, typing in a query, question, or task request, or clicking or touching any user interface element in the user interface 502 to enter a query, question, or task request. With each input from the person 102, the suggestion engine 504 provides a list of suggestions to facilitate the person 102 to complete the entire input. In this embodiment, the suggestion engine 504 may provide suggestions based on the person's private and/or semi-private information retrieved by the person-centric knowledge retriever 526 from the person-centric space 200 and/or the person-centric knowledge database 532. Those suggestions include, for example, a contact name from the private Contacts, part of a tweet from Twitter, or a package tracking status stored in the person-centric space 200. In some embodiments, the suggestion engine 504 may blend those suggestions based on the person 102's private and/or semi-private information with the conventional suggestions based on popular query logs and search history. In this embodiment, the intent engine 524 may provide an estimated intent associated with each input to help filtering and/or ranking the suggestions provided to the person 102.

Each of the query interface 506, Q/A interface 508, and task interface 510 is configured to receive a particular type of user inputs and forward them to the respective engine for handling. Once the results are returned from the respective engine and/or from the dynamic card builder 528, each of the query interface 506, Q/A interface 508, and task interface 510 forwards the results to the user interface 502 for presentation. In one embodiment, the user interface 502 may first determine the specific type of each input and then dispatch it to the corresponding interface. For example, the user interface 502 may identify that an input is a question based on semantic analysis or keyword matching (e.g., looking for keywords like "why" "when" "who," etc. and/or a question mark). The identified question is then dispatched to the Q/A interface 508. Similarly, the user interface 502 may determine, based on semantic analysis and/or machine learning algorithms, that an input is a task request and forward the input to the task interface 510. For any input that cannot be classified or does not fall within the categories of question and task request, the user interface 502 may forward it to the query interface 506 for general query search. It is understood that, in some embodiments, the user interface 502 may not classify an input first, but instead, forward the same input to each of the query interface 506, Q/A interface 508, and task interface 510 to have their respective engines to process the input in parallel.

Another function of the user interface 502 involves presenting information to the person 102 either as responses to the inputs, such as search results, answers, and task status, or as spontaneous notices, reminders, and updates in response to any triggering events. In this embodiment, the information to be presented to the person 102 via the user interface 502 may be presented in the form of cards that are dynamically built on-the-fly by the dynamic card builder 528 based on the intent estimated by the intent engine 524. The cards may be of different types, such as an email card summarizing one or more related emails, a search results card summarizing information relevant to one or more search results, an answer card including an answer to a question with additional information associated with the answer, or a notice card that is automatically generated to notify the person 102 of any event of interest. Based on its type, a card may be dispatched to one of the query interface 506, Q/A interface 508, and task interface 510 and eventually presented to the person 102 via the user interface 502. In addition to cards, information in any other format or presentation styles, such as search results in a research results page with "blue links" or answers in plain text, may be provided by the search engine 516 and the Q/A engine 518 directly to the query interface 506 and Q/A interface 508, respectively. It is understood that the user interface 502 may also provide information in a hybrid matter, meaning that some information may be presented as cards, while other information may be presented in its native format or style.

As the user interface 502 receives an input from the person 102, it also triggers the contextual information identifier 512 to collect any contextual information related to the person 102 and the input of the person 102. The contextual information identifier 512 in this embodiment receives user-related information from the user database 514, such as the person 102's demographic information and declared and inferred interests and preferences. Another source of contextual information is the person 102's device including, for example, date/time obtained from the timer of the person 102's device, location obtained from a global positioning system (GPS) of the person 102's device, and information related to the person 102's device itself (e.g., the device type, brand, and specification). Further, the contextual information identifier 512 may also receive contextual information from the user interface 502, such as one or more inputs immediately before the current input (i.e., user-session information). Various components in the person-centric INDEX system 202, including the cross-linking engine 542, knowledge engine 530, and intent engine 524, may take advantage of the contextual information identified by the contextual information identifier 512.

The intent engine 524 in this embodiment has two major functions: creating and updating the intent database 534 and estimating an intent based on the information stored in the intent database 534. The intent database 534 may store a personal intent space which includes all the intents that make sense to the person 102 in the form of an action plus a domain. For example, based on the person 102's search history, the intent engine 524 may identify that the person 102 has repeatedly entered different queries all related to the same intent "making restaurant reservations." This intent then may be stored as a data point in the person's personal intent space in the intent database 534 in the form of {action=making reservations; domain=restaurant}. More and more data points will be filled into the personal intent space as the person 102 continues interacting with the person-centric INDEX system 202. In some embodiments, the intent engine 524 may also update the personal intent space in the intent database 534 by adding new intents based on existing intents. For instance, the intent engine 524 may determine that hotel is a domain that is close to the restaurant domain and thus, a new intent "making hotel reservations" (in the form of {action=making reservations; domain=hotel}) likely makes sense to the person 102 as well. The new intent "making hotel reservations," which is not determined from user data directly, may be added to the personal intent space in the intent database 534 by the intent engine 524. In some embodiments, the intent database 534 include a common intent space for the general population. Some intents that are not in the personal intent space may exist in the common intent space. If they are popular among the general population or among people similar to the person 102, then the intent engine 524 may consider those intents as candidates as well in intent estimation.

In estimating intent of the person 102, the intent engine 524 receives the input from the user interface 502 or any information retrieved by the person-centric knowledge retriever 526 and tries to identify any action and/or domain from the input that is also in the intent spaces in the intent database 534. If both action and domain can be identified from the input, then an intent can be derived directly from the intent space. Otherwise, the intent engine 524 may need to take the contextual information from the contextual information identifier 512 to filter and/or rank the intent candidates identified from the intent space based on the action or domain. In one example, if the input involves only the action "making reservations" without specifying the domain, the intent engine 524 may first identify a list of possible domains that can be combined with such action according to the personal intent space, such as "hotel" and "restaurant." By further identifying that the location where the input is made is at a hotel, the intent engine 524 may estimate that the person 102 likely intends to make restaurant reservations as he is already in the hotel. It is understood that in some cases, neither action nor domain can be identified from the input or the identified action or domain does not exist in the intent space, the intent engine 524 may estimate the intent purely based on the available contextual information. Various components in the person-centric INDEX system 202, including the search engine 516, the suggestion engine 504, the dynamic card builder 528, and the person-centric knowledge retriever 526, may take advantage of the intent estimated by the intent engine 524.

The search engine 516 in this embodiment receives a search query from the query interface 506 and performs a general web search or a vertical search in the public space 108. Intent estimated by the intent engine 524 for the search query may be provided to the search engine 516 for purposes such as query disambiguation and search results filtering and ranking. In some embodiments, some or all of the search results may be returned to the query interface 506 in their native format (e.g., hyperlinks) so that they can be presented to the person 102 on a conventional search results page. In this embodiment, some or all of the search results are fed into the dynamic card builder 528 for building a dynamic search results card based on the estimated intent. For instance, if the intent of the query "make reservation" is estimated as "making restaurant reservations," then the top search result of a local restaurant may be provided to the dynamic card builder 528 for building a search results card with the name, directions, menu, phone number, and reviews of the restaurant.

The Q/A engine 518 in this embodiment receives a question from the Q/A interface 508 and classifies the question into either a personal or non-personal question. The classification may be done based on a model such as a machine learning algorithm. In this embodiment, the Q/A engine 518 may check the person-centric knowledge database 532 and/or the private database 548 and semi-private database 546 in the person-centric space 200 via the person-centric knowledge retriever 526 to see if the question is related to any private, semi-private data, or personal knowledge of the person 102. For instance, the question "who is Taylor Swift" is normally classified as a non-personal question. But in the case if "Taylor Swift" is in the person 102's Contacts or social media friend list, or if "Taylor Swift" has sent emails to the person 102, the Q/A engine 518 then may classify the question as a personal question. For non-personal questions, any known approaches may be used to obtain the answers.

Once the question is classified as personal, various features including entities and relationships are extracted by the Q/A engine 518 from the question using, for example, a machine learned sequence tagger. The extracted entities and relationships are used to traverse, by the person-centric knowledge retriever 526, the person-centric knowledge database 532, which stores person-centric relationships stored in a pre-defined form. In some embodiments, the person-centric relationships may be stored in a triple format including one or more entities and a relationship therebetween. When the Q/A engine 518 finds an exact match of relationship and entity, it returns an answer. When there is no exact match, the Q/A engine 518 takes into consideration a similarity between the question and answer triples and uses the similarity to find the candidate answers. To measure the similarity, words embedded over a large corpus of user texts may be collected and trained by the Q/A engine 518. The well-organized, person-centric information stored in the person-centric space 200 and the person-centric knowledge database 532 makes it possible for the Q/A engine 518 to answer a personal question in a synthetic manner without the need of fully understanding the question itself. The answers generated by the Q/A engine 518 may be provided to the dynamic card builder 528 for building answer cards.

The task generation engine 520 and the task completion engine 522 work together in this embodiment to achieve automatic task generation and completion functions of the person-centric INDEX system 202. The task generation engine 520 may automatically generate a task in response to a variety of triggers, including for example, a task request from the person 120 received via the task interface 510, an answer generated by the Q/A engine 518, a card constructed by the dynamic card builder 528, or an event or behavior pattern related to the person 102 from the person-centric space 200 and/or the person-centric knowledge database 532. Intent may have also been taken into account in some embodiments in task generation. The task generation engine 520 in this embodiment also divides each task into a series of task actions, each of which can be scheduled for execution by the task completion engine 522. The task template database 538 stores templates of tasks in response to different triggers. The task generation engine 520 may also access the task template database 538 to retrieve relevant templates in task generation and update the templates as needed. In some embodiments, the task generation engine 520 may call the dynamic card builder 528 to build a card related to one or more tasks so that the person 102 can check and modify the automatically generated task as desired.

The tasks and task actions are stored into task lists 540 by the task generation engine 520. Each task may be associated with parameters, such as conditions in which the task is to be executed and completed. Each individual task action of a task may also be associated with execution and completion conditions. The task completion engine 522 fetches each task from the task lists 540 and executes it according to the parameter associated therewith. For a task, the task completion engine 522 dispatches each of its task actions to an appropriate executor to execute it, either internally through the person-centric knowledge retriever 526 or externally in the public space 108, semi-private space 106, or private space 104. In one example, task actions such as "finding available time on Tuesday for lunch with mom" can be completed by retrieving calendar information from the private database 548 in the person-centric space 200. In another example, task actions like "ordering flowers from Aunt Mary's flower shop" can only be completed by reaching out to the flower shop in the public space 108. The task completion engine 522 may also schedule the execution of each task action by putting it into a queue. Once certain conditions associated with a task action are met, the assigned executor will start to execute it and report the status. The task completion engine 522 may update the task lists 540 based on the status of each task or task action, for example, by removing completed tasks from the task lists 540. The task completion engine 522 may also provide the status updates to the person-centric knowledge retriever 526 such that the status updates of any ongoing task become available for any component in the person-centric INDEX system 202 as needed. For instance, the dynamic card builder 528 may build a notice card notifying the person that your task request "sending flowers to mom on Mother's day" has been completed.

As a component that supports intent-based dynamic card construction for various front-end components, the dynamic card builder 528 receives requests from the search engine 516, the Q/A engine 518, the task generation engine 520, or the person-centric knowledge retriever 526. In response, the dynamic card builder 528 asks for the estimated intent associated with the request from the intent engine 524. Based on the request and the estimated intent, the dynamic card builder 528 can create a card on-the-fly by selecting suitable card layout and/or modules from the card module database 536. The selection of modules and layouts is not predetermined, but may depend on the request, the intent, the context, and information from the person-centric space 200 and the person-centric knowledge database 532. Even for the same query repeatedly received from the same person 102, completely different cards may be built by the dynamic card builder 528 based on the different estimated intents in different contexts. A card may be created by populating information, such as search results, answers, status updates, or any person-centric information, into the dynamically selected and organized modules. The filling of information into the modules on a card may be done in a centralized manner by the dynamic card builder 528 regardless of the type of the card or may be done at each component where the request is sent. For example, the Q/A engine 518 may receive an answer card construction with dynamically selected and organized modules on it and fill in direct and indirect answers into those modules by itself.

In one embodiment, the person-centric knowledge retriever 526 can search the person-centric space 200 and the person-centric knowledge database 532 for relevant information in response to a search request from the intent engine 524, the query interface, the Q/A engine 518, the suggestion engine 504, the dynamic card builder 528, or the task generation engine 520. The person-centric knowledge retriever 526 may identify one or more entities from the search request and search for the matched entities in the person-centric knowledge database 532. As entities stored in the person-centric knowledge database 532 are connected by relationships, additional entities and relationships associated with the matched entities can be returned as part of the retrieved information as well. As for searching in the person-centric space 200, in one embodiment, the person-centric knowledge retriever 526 may first look for private data in the private database 548 matching the entities in the search request. As data in the person-centric space 200 are cross-linked by cross-linking keys, the entities and/or the cross-linking keys associated with the relevant private data may be used for retrieving additional information from the semi-private database 546 and the public database 544. For instance, to handle a search request related to "amazon package," the person-centric knowledge retriever 526 may first look for information in the private database 548 that is relevant to "amazon package." If an order confirmation email is found in the private database 548, the person-centric knowledge retriever 526 may further identify that the order confirmation email is associated with a cross-linking key "tracking number" in the package shipping domain. Based on the tracking number, the person-centric knowledge retriever 526 then can search for any information that is also associated with the same tracking number in the person-centric space 200, such as the package delivery status information from www.FedEx.com in the public database 544. As a result, the person-centric knowledge retriever 526 may return both the order confirmation email and the package delivery status information as a response to the search request.

In some embodiments, the person-centric knowledge retriever 526 may retrieve relevant information from multiple data sources in parallel and then blend and rank all the retrieved information as a response to the search request. It is understood that information retrieved from each source may be associated with features that are unique for the specific source, such as the feature "the number of recipients that are cc'd" in the email source. In order to be able to blend and rank results from different sources, the person-centric knowledge retriever 526 may normalize the features of each result and map them into the same scale for comparison.

The cross-linking engine 542 in this embodiment associates information relevant to the person 102 from the private space 104, the semi-private space 106, and the public space 108 by cross-linking data based on cross-linking keys. The cross-linking engine 542 may first process all information in the private space 104 and identify cross-linking keys from the private space 104. For each piece of content in the private space 104, the cross-linking engine 542 may identify entities and determine the domain to which the content belongs. Based on the domain, one or more entities may be selected as cross-linking keys for this piece of content. In one example, tracking number may be a cross-linking key in the package shipping domain. In another example, flight number, departure city, and departure date may be cross-linking keys in the flight domain. Once one or more cross-linking keys are identified for each piece of information in the private space 104, the cross-linking engine 542 then goes to the semi-private space 106 and the public space 108 to fetch information related to the cross-linking keys. For example, the tracking number may be used to retrieve package delivery status information from www.FedEx.com in the public space 108, and the flight number, departure city, and departure date may be used to retrieve flight status from www.UA.com in the public space 108. Information retrieved by the cross-linking engine 542 from the private space 104, semi-private space 106, and public space 108 may be stored in the private database 548, semi-private database 546, and public database 544 in the person-centric space 200, respectively. As each piece of information in the person-centric space 200 is associated with one or more cross-linking keys, they are cross-linked with other information associated with the same cross-linking keys, regardless which space it comes from. Moreover, as the cross-linking keys are identified based on the person's private data (e.g., emails), all the cross-linked information in the person-centric space 200 are relevant to the person 102.

Although only one database is shown in FIG. 5 for information from the private space 104, the semi-private space 106, or the public space 108, it is understood that information within a particular space may be organized and stored in different databases in the person-centric space 200. For instance, private data from emails, Contacts, calendars, and photos may be stored in separate databases within the private database 548; semi-private data from Facebook, Twitter, LinkedIn, etc. may be stored in separate databases within the semi-private database 546 as well. Such arrangement may enable applying different feature extraction models to different data sources, which may be helpful for the suggestion engine 504 and the person-centric knowledge retriever 526. As mentioned above, the cross-linking engine 542 continuously and dynamically maintains and updates the person-centric space 200 on a regular basis and/or in response to any triggering event. For example, any internal operation, such as query search, question answering, or task completion, may trigger the cross-linking engine 542 to update the affected data or add missing data in the person-centric space 200.

The knowledge engine 530 in this embodiment processes and analyzes the information in the person-centric space 200 to derive analytic results in order to better understand the person-centric space 200. In one embodiment, the knowledge engine 530 extracts entities from content in the person-centric space 200 and resolves them to what they refer to (i.e., can disambiguate an extracted entity when it may refer to multiple individuals). In addition to determining an entity type for an extracted entity name, the knowledge engine 530 may also determine a specific individual referred to by this entity name. The knowledge engine 530 can make use of contextual information and/or textual metadata associated with the entity name in the email to disambiguate such cases, providing a high precision resolution.

The knowledge engine 530 also builds a person-centric knowledge representation for a person 102 by extracting and associating data about the person 102 from personal data sources. The person-centric knowledge representation for the person 102 is stored in the person-centric knowledge database 532. The knowledge engine 530 can extract entities related to the person 102 and infer relationships between the entities without the person 102's explicit declaration, and create, for example, a person-centric knowledge graph for the person 102 based on the entities and relationships. The knowledge elements that can be inferred or deduced may include, for example, the person 102's social contacts, and the person 102's relationships with places, events, or other users.

Figure 6:
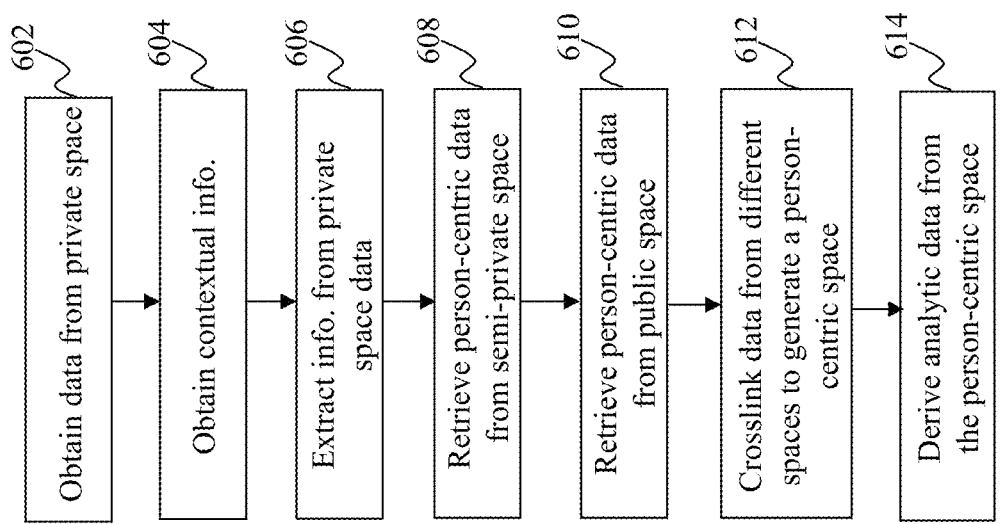
FIG. 6 is a flowchart of an exemplary process for building a person-centric space, according to an embodiment of the present teaching.

FIG. 6 is a flowchart of an exemplary process for building a person-centric space, according to an embodiment of the present teaching. Starting at 602, data from the private space 104 is obtained. The data includes any content that is private to a person, such as emails, Contacts, calendar events, photos, bookmarks, instant messages, usage records, and so on. Contextual information is obtained at 604. The contextual information includes, but is not limited to, user information such as demographic information and interests and preferences, locale information, temporal information, device information, and user-session information (e.g., other user inputs in the same or adjacent user-sessions). At 606, information from the private space data is extracted. The information may be cross-linking keys determined from entities extracted from the private space data based on the domain of the private space data and/or the obtained contextual information. Person-centric data is then retrieved from the semi-private space at 608. Similarly, person-centric data is retrieved from the public space at 610. In this embodiment, the person-centric data is retrieved based on the cross-linking keys. At 612, all pieces of person-centric data retrieved from the private space, semi-private space, and public space are cross-linked together to generate a person-centric space. In this embodiment, the cross-linking is done based on the same cross-linking keys associated with these pieces of person-centric data. At 614, analytic data is derived from the person-centric space. For example, entities may be extracted from the person-centric space and are disambiguated by the knowledge engine 530 to ascertain their extract meanings. Relationships between the entities may be inferred based on information from the person-centric space by the knowledge engine 530 as well. Based on the entities and relationships, person-centric knowledge can be derived and stored in the person-centric knowledge database 532.

Figure 7:
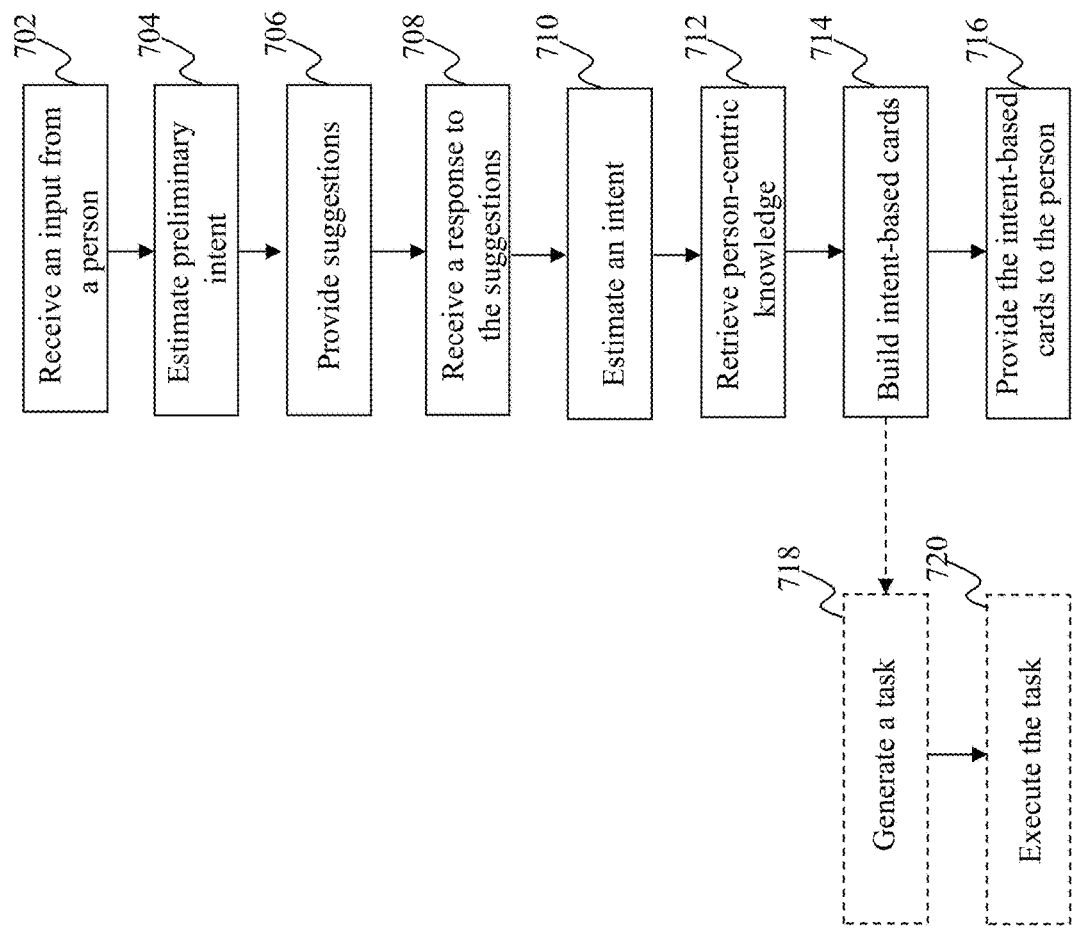
FIG. 7 is a flowchart of an exemplary process for applying a person-centric space for digital personal assistance, according to an embodiment of the present teaching.

FIG. 7 is a flowchart of an exemplary process for applying a person-centric space for digital personal assistance, according to an embodiment of the present teaching. Starting at 702, an input from a person is received. As the person enters the input, a preliminary intent is estimated and continuously updated at 704. The estimation may be based on the current input and any contextual information currently available. At 706, one or more suggestions are generated based on the current input and the estimated intent and provided to the person to assist completing the current input. A response to the suggestions is received from the person at 708. The response may be a selection of one suggestion or ignoring the suggestions and finishing the input as the person desires. Once the completed input is received, either as a selection of a suggestion or a fully-entered input, at 710, the intent is estimated again for the completed input. The intent may be estimated based on the completed input and the currently available contextual information. In some embodiments, if no input is received (e.g., when the person just logs into and has not entered anything yet), the intent may be estimated based on the contextual information alone. At 712, person-centric knowledge is retrieved based on the input. In some embodiments, the estimated intent may be used for retrieving the person-centric knowledge as well. As described above in detail, the input may be a question, a task request, or a query. In any event, entities and/or relationships may be derived from the input and are used for retrieving relevant person-centric knowledge from the person-centric knowledge database 532. In some embodiments, additional information may be retrieved from the person-centric space. Intent-based cards are built at 714. Each card may be constructed based on a layout and one or more modules that are selected based on the type of the card and the estimated intent. Content in each module may be filled in based on the person-centric knowledge and any additional information retrieved at 712. Optionally or additionally, at 718, the construction of a card may cause a task to be generated based on the estimated intent. For instance, an email card summarizing an online order confirmation email may trigger the generation of a task for automatically tracking the package delivery status. At 720, the task is executed. Nevertheless, at 716, the intent-based cards, either an email card, an answer card, a search results card, or a notice card, are provided to the person as a response to the input.

Figure 8:
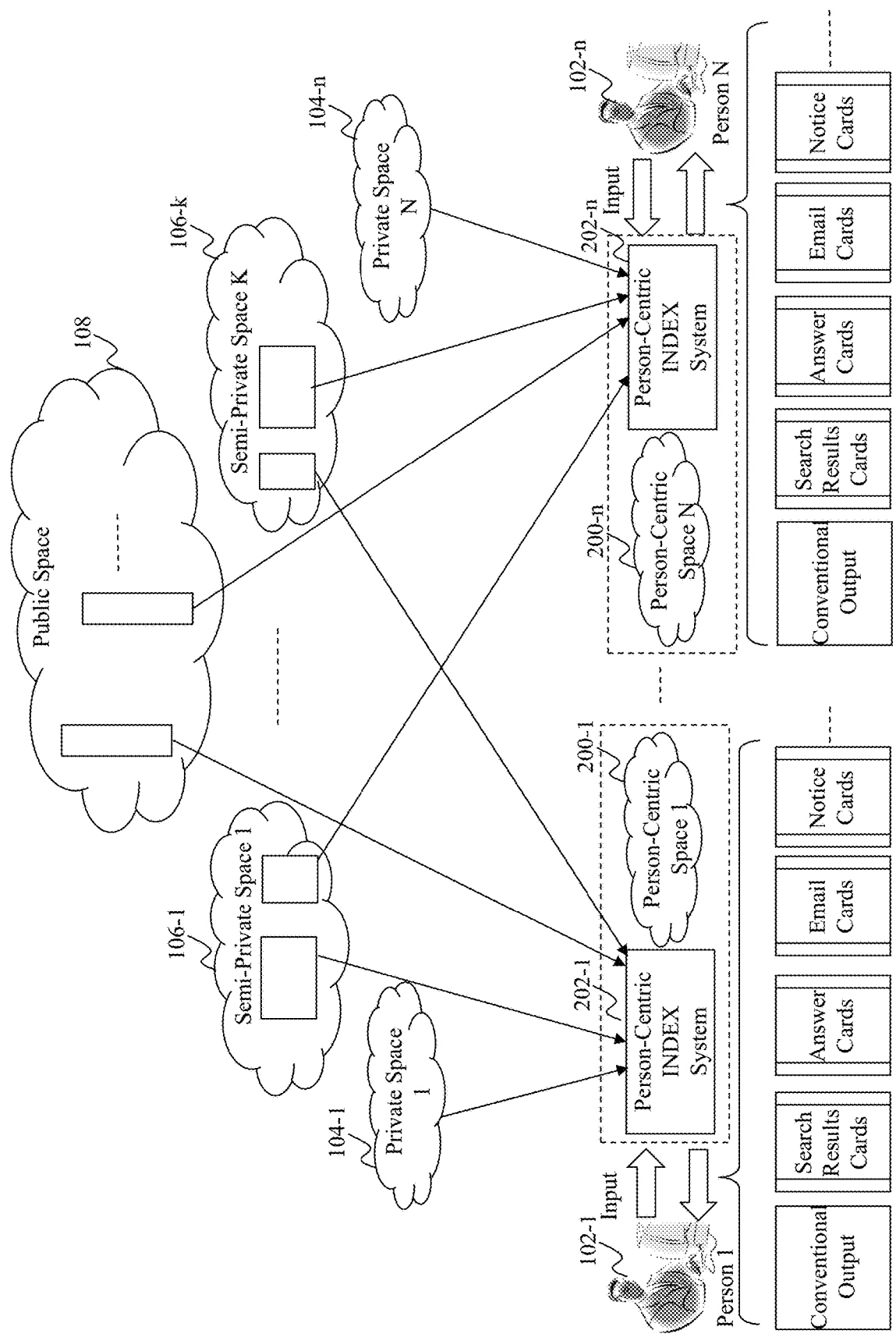
FIG. 8 depicts an exemplary scheme of building a person-centric space for each individual person via a person-centric INDEX system and applications thereof, according to an embodiment of the present teaching.

FIG. 8 depicts an exemplary scheme of building a person-centric space for each individual person via the person-centric INDEX system and applications thereof, according to an embodiment of the present teaching. In this embodiment, each person 102-1, . . . **102-*n* may access its own person-centric INDEX system 202-1, . . . 202-*n*, respectively. The person-centric INDEX system 202 may be a stand-alone system installed on each person 102-1, . . . 102-*n*'s device, a cloud-based system shared by different persons 102-1, . . . 102-*n*, or a hybrid system in which some components are installed on each person 102-1, . . . 102-*n*'s device and some components are in the cloud and shared by different persons 102-1, . . . 102-*n***.

In this embodiment, individual person-centric spaces 200-1, . . . **200-*n* are generated for each person 102-1, . . . 102-*n* via its own person-centric INDEX system 202-1, . . . 202-*n*, respectively For example, person-centric space 1 200-1 includes the projections from different spaces related to person 1 102-1 from the perspectives of person 1 102-1 (e.g., the entire private space 1 104-1, parts of the semi-private spaces 1-*k* 106-1, . . . 106-*k* that are relevant to person 1 102-1, and a slice of the public space 108 that is relevant to person 1 102-1). Each person 102-1, . . . 102-*n* then uses its own person-centric INDEX system 202-1, . . . 202-*n* to access its own person-centric space 200-1, . . . 200-*n***, respectively. Based on inputs from a person to its person-centric INDEX system, outputs are returned based on information from the person-centric space in any forms and styles, including, for example, any conventional outputs such as search result pages with "blue links," and any types of intent-based cards such as search results cards, answer cards, email cars, notice cards, and so on.

Figure 9:
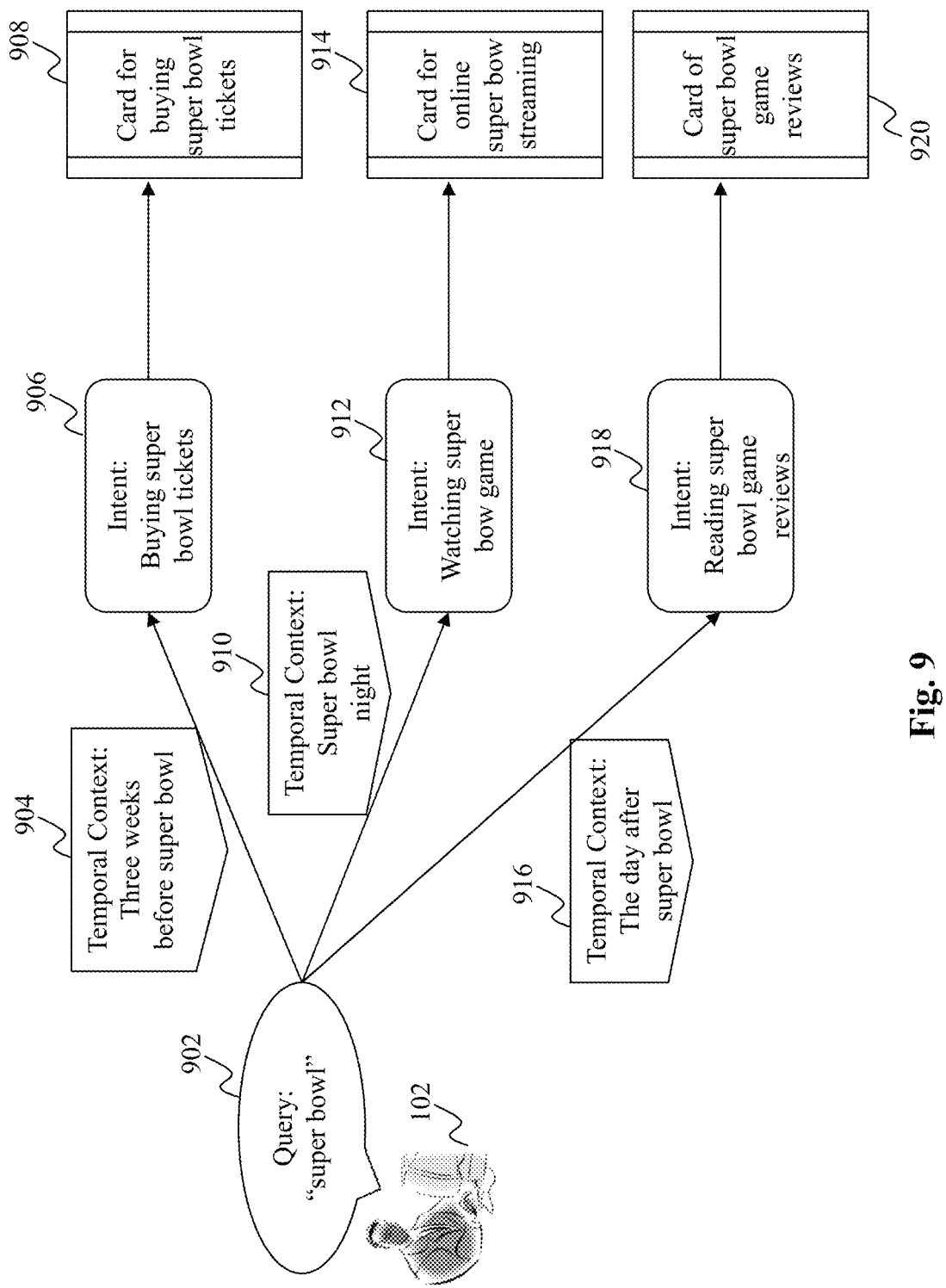
FIG. 9 depicts an exemplary scheme in which a variety of dynamic cards are built and provided to a person based on different intents estimated for the same query in different contexts, according to an embodiment of the present teaching.

FIG. 9 depicts an exemplary scheme in which a variety of dynamic cards are built and provided to a person based on different intents estimated for the same query in different contexts, according to an embodiment of the present teaching. Conventionally, a static card that has been pre-constructed for certain popular entities may be presented to a person when the query from the person happens to include one of those popular entities. In contrast, intent-based cards according to the present teaching can be dynamically generated on-the-fly by the person-centric INDEX system 202 responsive to a query 902 from the person 102. In this example, the person 102 inputs the same query 902 "super bowl" at different times. When the query 902 is entered three weeks before the super bowl game, its temporal context 904 will likely cause the intent 906 to be estimated as "buying super bowl tickets." Based on such intent, a card 908 is dynamically generated for buying super bowl tickets, including information such as super bowl ticket prices, tips on how to purchase, purchase website, etc. In some embodiments, the generation of this card 908 would cause a task of purchasing super bowl tickets to be automatically generated and completed. As time passes, when the temporal context 910 changes to the super bowl night, when the person 102 enters the same query 902, the intent 912 will likely change to "watching super bowl game." Accordingly, a different card 914 for online super bowl game streaming is built and presented to the person 102, which may include, for example, websites currently streaming the game. When the game finishes and the temporal context 916 changes to the day after the super bowl game, if the person 102 again enters the query 902, the intent 918 will likely become "reading super bowl game reviews." A card 920 of super bowl game reviews is constructed and presented to the person 102. It is understood that the examples described above are for illustrative purpose and are not intended to be limiting.

Figure 10:
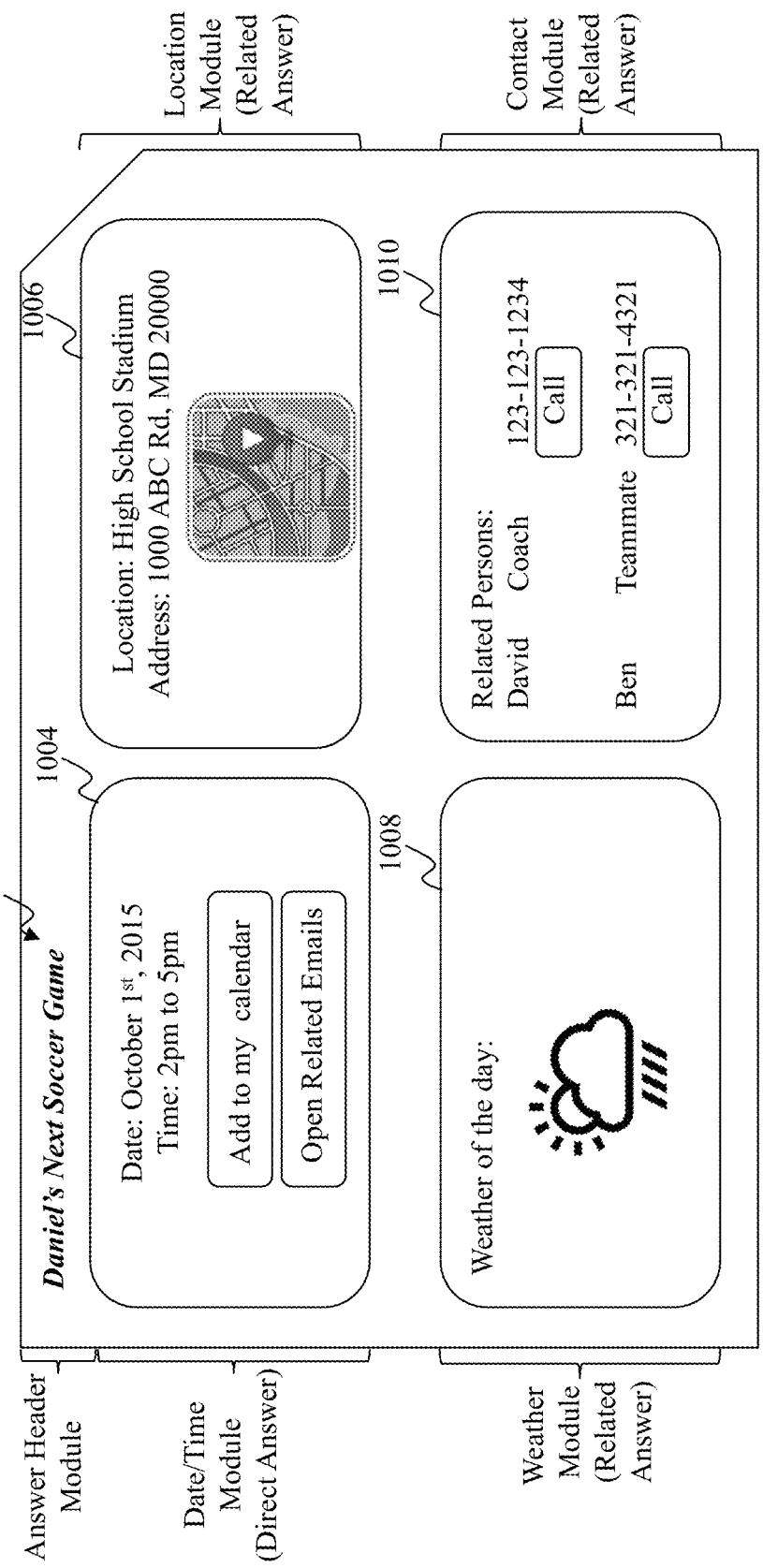
FIG. 10 illustrates an exemplary answer card, according to an embodiment of the present teaching.

FIG. 10 illustrates an exemplary answer card, according to an embodiment of the present teaching. The answer card 1000 in this example is dynamically constructed on-the-fly in response to the question "when is my son's soccer game?" Based on the type of the card (answer card) and intent (finding out my son's soccer game date/time), the layout and modules are determined as shown in FIG. 10. It is understood that the shape, size, and layout of the answer card 1000 is for illustrative purpose only and may vary in other examples. In some embodiments, the shape, size, and layout may be dynamically adjusted to fit the specification of the user device (e.g., screen size, display resolution, etc.).

In this example, the answer card includes an answer header module 1002 indicating that the topic of the answer card 1000 is "Daniel's (my son's name identified according to person-centric knowledge) Next Soccer Game." The direct answer to the question is found from a private email and provided in the date/time module 1004. Optionally, certain actions related to the answer may be provided as well, such as "add to my calendar" and "open related emails." Other information related to the direct answer is provided in other modules as well. The location module 1006 provides the location, address, and map of the soccer game. Information such as location and address may be retrieved from the email related to the game in the private database 548 of the person-centric space 200, while the map may be retrieved from Google Maps in the public space 108. The weather module 1008 provides the weather forecast of the game day, which may be retrieved from wwww.Weather.com in the public space 108. The contact module 1010 shows persons involved in the game and their contact information retrieved from the email about the game and private Contacts in the private database 548 of the person-centric space 200. Optionally, action buttons may be provided to call the persons directly from the answer card 1000. It is understood that the example described above is for illustrative purpose and are not intended to be limiting.

Figure 11:
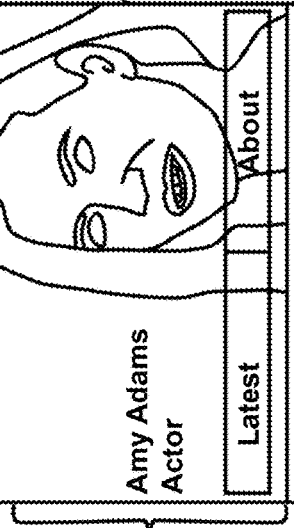
FIG. 11 illustrates an exemplary search results card, according to an embodiment of the present teaching.

FIG. 11 illustrates an exemplary search result card, according to an embodiment of the present teaching. The search results card 1100 in this example is dynamically constructed on-the-fly in response to the query "amy adams." Based on the type of the card (a search results card) and intent (learning more about actor Amy Adams), the layout and modules are determined as shown in FIG. 11. It is understood that the shape, size, and layout of the search results card 1100 is for illustrative purpose only and may vary in other examples. In some embodiments, the shape, size, and layout may be dynamically adjusted to fit the specification of the user device (e.g., screen size, display resolution, etc.). In this example, the search results card 1100 includes a header module 1102 with the name, occupation, and portrait of Amy Adams. The bio module 1104 includes her bio retrieved from Wikipedia, and the movies module 1106 includes her recent movies. In the movies module 1106, each movie may be presented in a "mini card" with the movie's name, release year, poster, and brief instruction, which are retrieved from www.IMDB.com. The movies module 1106 is actionable so that a person can swap the "mini cards" to see information of more her movies. If more modules cannot be shown simultaneously due to the size of the search results card 1100 (for example when it is shown on a smart phone screen), tabs (e.g., "Latest," "About") may be used to display different modules. It is understood that the example described above is for illustrative purpose and are not intended to be limiting.

Figure 12:
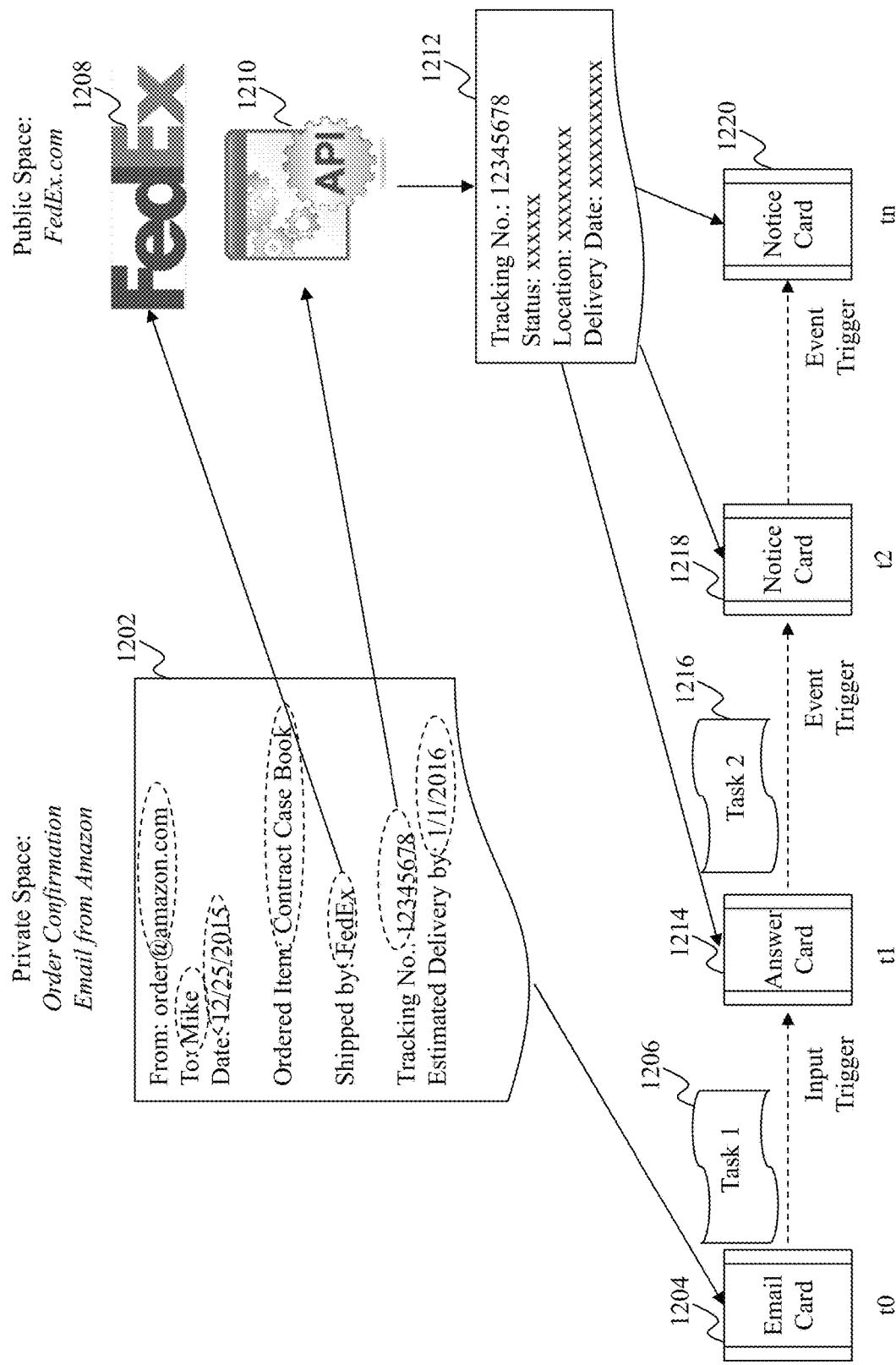
FIG. 12 depicts an exemplary scheme of automatic online order email summary and package tracking via cross-linked data in a person-centric space, according to an embodiment of the present teaching.

FIG. 12 depicts an exemplary scheme of automatic online order email summary and package tracking via cross-linked data in a person-centric space, according to an embodiment of the present teaching. Various aspects of the present teaching are illustrated in FIG. 12 as well as related FIGS. 13-15, including cross-linking data from different spaces, entity extraction and building person-centric knowledge representation, dynamic card productions based on intent, answering personal questions, and automatic task generation and completion. In this example, at time to, an order confirmation email 1202 is received from www.Amazon.com. The email 1202 in the private space is processed to extract and identify entities. The entities include, for example, seller/vendor—www.Amazon.com, recipient/person—Mike, order date—12/25/2015, item—Contract Case book, shipping carrier—FedEx, tracking number—12345678, and estimated delivery date: 1/1/2016. In response to receiving the email 1202, an email card 1204 summarizing the email 1202 is generated and may be provided to Mike automatically or upon his request.

Figure 13:
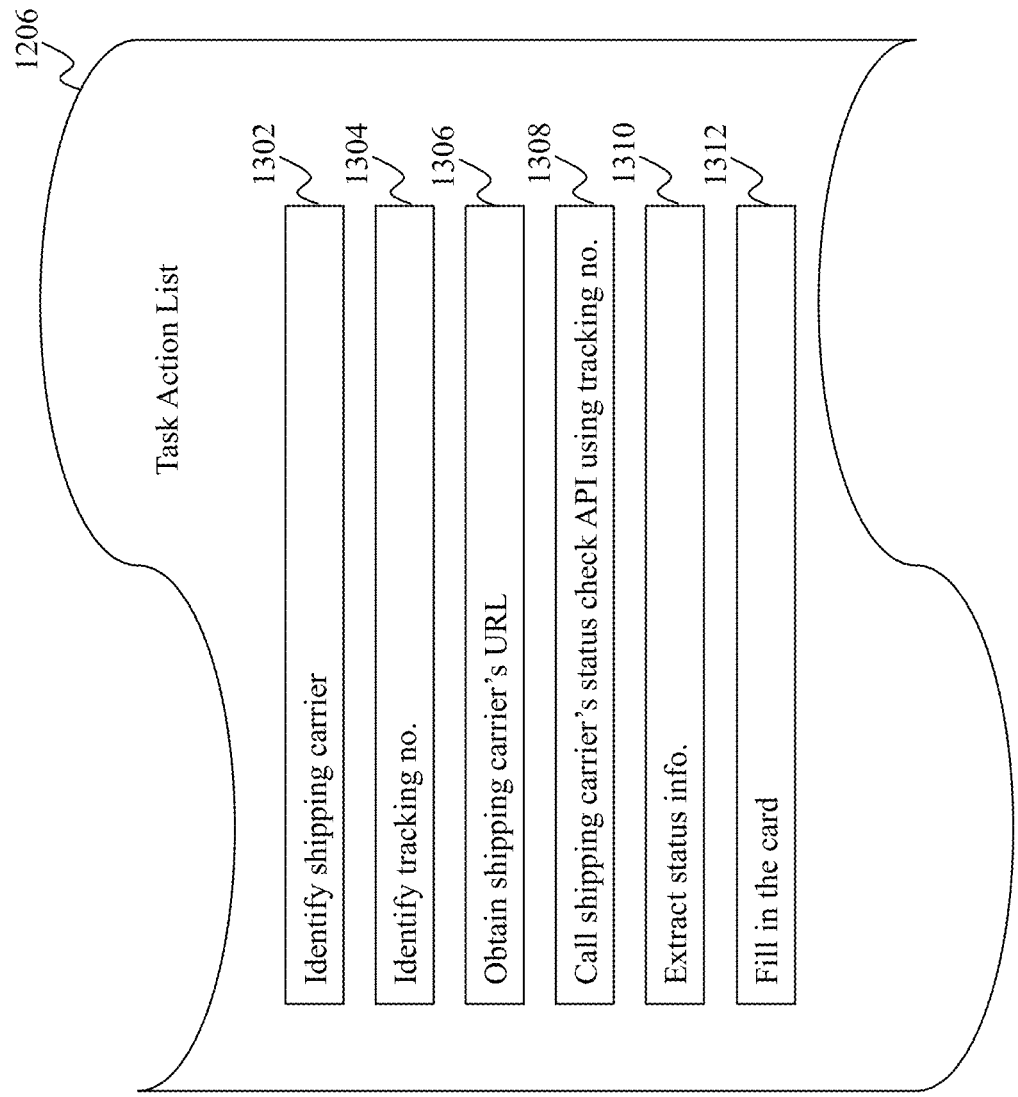
FIG. 13 illustrates an exemplary task with a list of task actions for automatic package tracking.

The generation of the email card 1204 in this example automatically initiates the generation of task 1 1206 for checking package delivery status. The details of task 1 1206 will be described in FIG. 13. In order to check the package delivery status, one or more cross-linking keys in the package shipping domain are identified among the entities extracted from the email 1202. As shown in FIG. 13, the entity "shipping carrier—FedEx" is a cross-linking key used for identifying the website of FedEx 1208 in the public space, and the entity "tracking number—12345678" is a cross-linking key used for calling the status check API 1210 of FedEx 1208. Based on the tracking number, package delivery status information 1212 is retrieved from FedEx 1208. Different pieces of information from the private space and public space are thus cross-linked based on the cross-linking keys and can be projected into the person-centric space.

At time t1, in response to an input from Mike (e.g., a question "where is my amazon order?"), an answer card 1214 is dynamically generated based on private information in the email card 1204 and the public package delivery status information 1212. The answer card 1214 is presented to Mike as an answer to his question. In this example, the generation of the answer card 1214 automatically initiates another task 2 1216 for monitoring and reporting package delivery status update. According to task 2 1216, package delivery status information 1212 may be regularly refreshed and updated according to a schedule (e.g., every two hours) or may be dynamically refreshed and updated upon detecting any event that affects the package delivery. In this example, at times t2 and tn, certain events, such as package being delayed due to severe weather or package being delivered, trigger the generation of notice cards 1218, 1220, respectively. It is understood that the example described above is for illustrative purpose and are not intended to be limiting.

FIG. 13 illustrates an exemplary task with a list of task actions for automatic package tracking. Task 1 1206 for tracking package delivery status in this example includes a series of task actions (task action list): identifying shipping carrier 1302, identifying tracking number 1304, obtaining shipping carrier's URL 1306, calling shopping carrier's status check API using the tracking number 1308, extracting status information 1310, and filling in the card 1312. Each task action may be associated with parameters such as conditions in which the task action is to be executed. For example, for task action 1312 "filling in the card," the condition may be filling the current package delivery status into an answer card when a question about the package delivery status is asked by the person or filling the current package delivery status into a notice card of package delivery status update without waiting for any input from the person. Some task actions (e.g., 1302, 1304) may be executed by retrieving relevant information from the person-centric space 200 and/or the person-centric knowledge database 532, while some task actions (e.g., 1308) need to be completed in the public space 108. It is understood that the example described above is for illustrative purpose and are not intended to be limiting.

Figure 14:
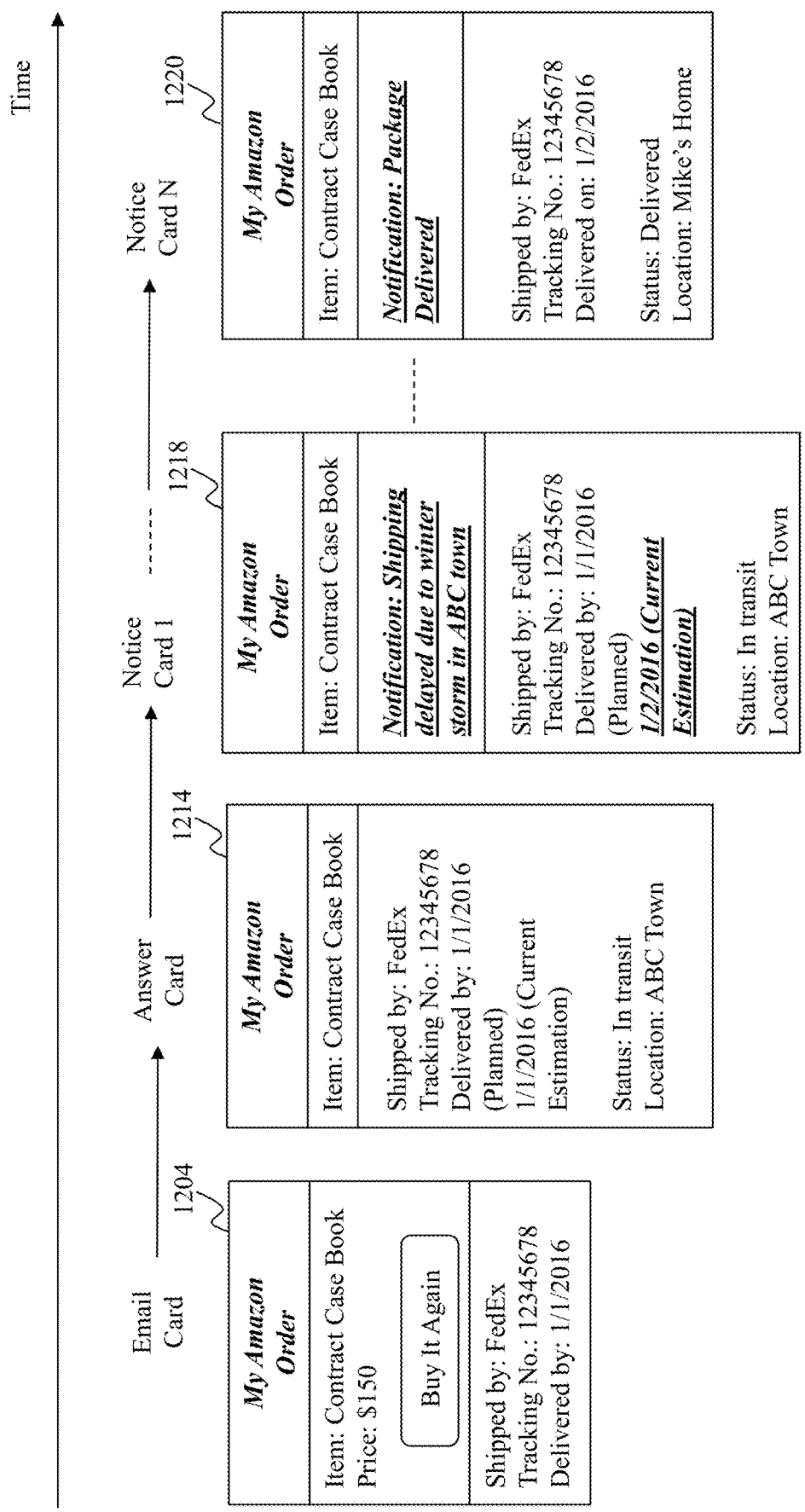
FIG. 14 illustrates a series of exemplary cards provided to a person in the process of automatic online order email summary and package tracking.

FIG. 14 illustrates a series of exemplary cards provided to a person in the process of automatic online order email summary and package tracking. In this example, the email card 1204 is automatically generated responsive to receiving the amazon order confirmation email 1202 and summarizes the email 1202 based on the entities extracted from the email 1202 and relationships thereof. The email card 1204 includes a header module "My Amazon Oder" and an order module with entities of item and price. A "buy it again" action button may be added in the order module. The email card 1204 also includes a shipping module with entities of shipping carrier, tracking number, and scheduled delivery date.

In this example, the answer card 1214 is generated in response to a question from the person about the status of the package. The answer card 1214 includes the header module and order module (but with less information as the order information is not a direct answer to the question). The answer card 1214 includes a shipping module with rich information related to shipping, which is retrieved from both the private email 1202 and FedEx 1208. The information includes, for example, entities of shipping carrier, tracking number, and scheduled delivery date from the private email 1202, and current estimated delivery date, status, and location from FedEx 1208.

In this example, multiple notice cards 1218, 1220 are automatically generated in response to any event that affects the status of the package. Each notice card 1218, 1220 includes an additional notification module. If any other information is affected or updated due to the event, it may be highlighted as well to bring to the person's attention. In notice card 1 1218, shipment is delayed due to a winter storm in ABC town and as a consequence, the current estimated delivery date is changed according to information retrieved from FedEx 1208. According to notice card N 1220, the package has been delivered to Mike's home. It is understood that the examples described above are for illustrative purpose and are not intended to be limiting.

Figure 15:
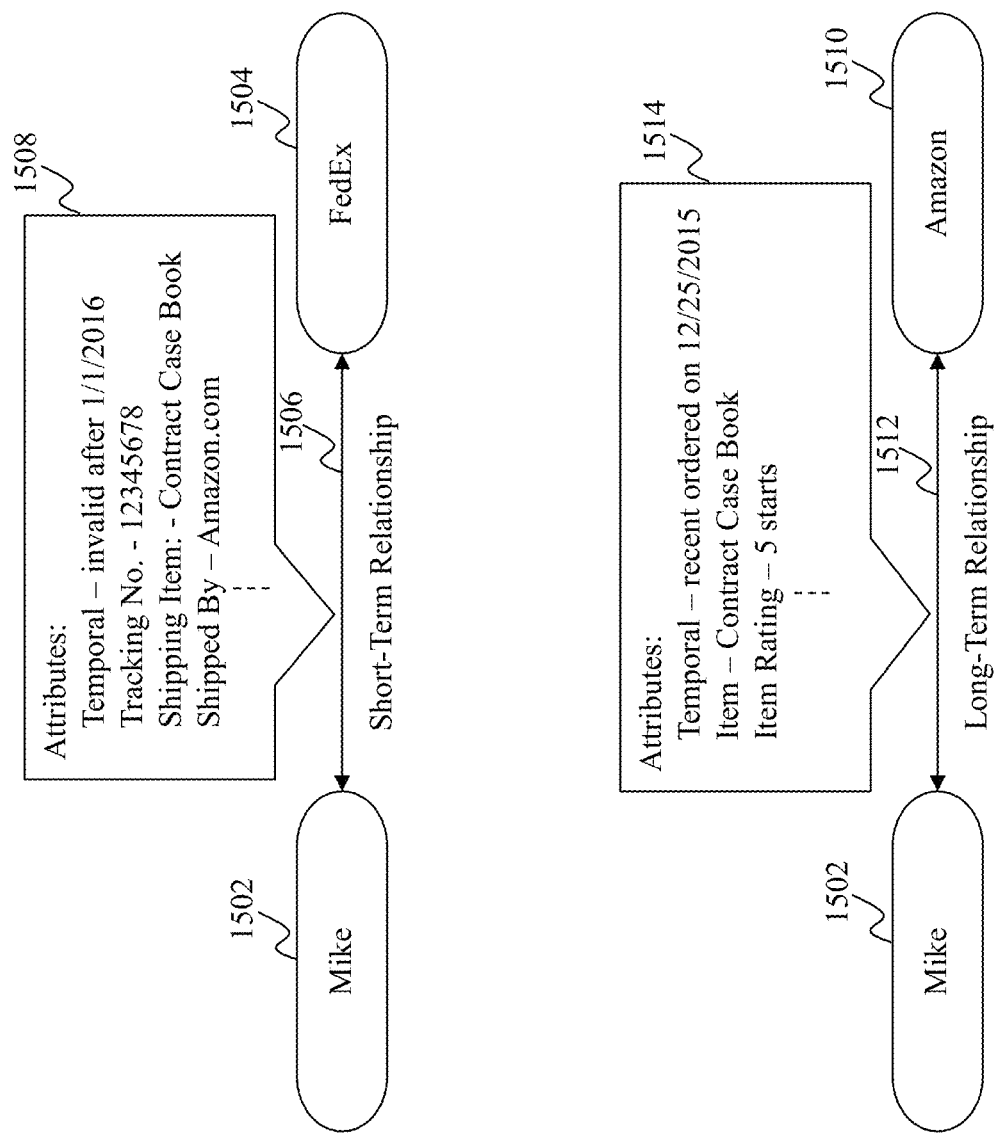
FIG. 15 illustrates exemplary entities extracted from a person-centric space and their relationships established in the process of automatic online order email summary and package tracking.

FIG. 15 illustrates exemplary entities extracted from a person-centric space and their relationships established in the process of automatic online order email summary and package tracking. As described above, the person-centric knowledge database 532 stores person-centric knowledge organized in the form of entity-relationship-entity triples. Entities extracted from the amazon order confirmation email 1202 are formed into entity-relationship-entity triples by the knowledge engine 530. In the example of FIG. 15, entity "Mike" 1502 from the recipient field of the email 1202 is determined as the person using the person-centric INDEX system 202, and entity "FedEx" 1504 is determined as a shipping carrier with a short-term relationship 1506 with entity "Mike" 1502. Attributes 1508 may be associated with the relationship 1506 including, for example, temporal attribute, tracking number, shipping item, sender, etc. These attributes may include related entities extracted from the email 1202 and any other attributes inferred based on the relationship 1506. It is noted that the relationship 1506 between entity "Mike" 1502 and entity "FedEx" 1504 is a short-term, temporary relationship in the sense that the relationship 1506 will become invalid after the shipment is completed, as indicated by the temporal attribute. In this example, entity "Mike" 1502 and another entity "Amazon" 1510 establish a long-term relationship 1512 with a different set of attributes 1514 thereof. The attributes 1514 include, for example, the temporal attribute, item, item rating, and so on. The relationship 1512 is long-term in this example because Mike has been repeatedly ordered goods from Amazon, which has become his behavior pattern or preference. It is understood that the examples described above are for illustrative purpose and are not intended to be limiting.

More detailed disclosures of various aspects of the person-centric INDEX system 202 are covered in different U.S. patent applications, entitled "Method and system for associating data from different sources to generate a person-centric space," "Method and system for searching in a person-centric space," "Methods, systems and techniques for providing search query suggestions based on non-personal data and user personal data according to availability of user personal data," "Methods, systems and techniques for personalized search query suggestions," "Methods, systems and techniques for ranking personalized and generic search query suggestions," "Method and system for entity extraction and disambiguation," "Method and system for generating a knowledge representation," "Method and system for generating a card based on intent," "Method and system for dynamically generating a card," "Method and system for updating an intent space and estimating intent based on an intent space," "Method and system for classifying a question," "Method and system for providing synthetic answers to a personal question," "Method and system for automatically generating and completing a task," "Method and system for online task exchange," "Methods, systems and techniques for blending online content from multiple disparate content sources including a personal content source or a semi-personal content source," and "Methods, systems and techniques for ranking blended content retrieved from multiple disparate content sources." The present teaching is particularly directed to dynamically generating a card.

To better help a user organizing desired information, a search engine may provide a search result in form of a card, like the card shown in FIG. 11, instead of a search engine result page including conventional "blue links." In general, a "card" disclosed herein may refer to a form of design pattern or interface that works especially well for portable screen on mobile devices. Existing card production techniques focus on organizing results based on an entity. For example, if a query "Tom Cruise" is received, then the search engine may provide an Actor Card for the actor Tom Cruise showing general information about Tom Cruise in Wikipedia, followed by Tom Cruise's movies, images, videos, news, tweets, etc. The information to be put into the Actor Card has been predetermined based on Tom Cruise, instead of dynamically generated based on the user submitting the query.

Instead of focusing on the entity, the system in the present teaching may focus on the user's intent to dynamically build a card for the user. Knowing the user's intent when the card is created to answer the query, the system can provide relevant information on the card. The relevant information may include partial information associated with the entity in the query, and/or additional information not related to the entity but related to the user's intent. This intent may be explicitly specified in the query, or derived from the context, trending events or the user's person-centric knowledge. For example, a user may have very different intent if a query "Super Bowl" is submitted at different timing points, e.g., when Super Bowl is going to take place in a week vs. when the Super Bowl game is in progress. In another example, a first query about a new movie may indicate different user intent from that indicated by a second query about an old movie, although both queries refer to a same domain of knowledge. The user submitting the new movie query may have intent to know where the new movie is showing and its show time, and to buy a ticket of the movie at a cinema accordingly. In contrast, the user submitting the old movie query may have intent to find a place to stream and watch the movie online.

In one embodiment, knowing the current intent of a user, the system can anticipate the next intent of the user, such that the current card provided by the system can lead to one or more next steps. For example, the system can anticipate that after looking at the show times of a new movie, the user would like to buy tickets.

In another embodiment, focusing on the user's intent, the system can answer the user with a card even when there is no entity in the query or request, i.e., in a query-less or anticipatory use case. For example, if the system determines that a user has a behavior pattern of searching traffic information from work to home at 5 pm on workdays in the past, then from now on, the system may automatically generate and provide a notice card to the user at around 5 pm on every workday, to notify the user about the traffic information regardless whether a query is received from the user.

In addition to presenting a search result, cards in the present teaching may also be used for presenting a notice, an answer to a question, a summary of an email, etc.

Although there are existing products using rich cards to present results in response to a query, the products use static templates for creating the cards. Once a given domain is determined for a query (e.g., based on an entity in the query), the products will always put a fixed group of modules associated with that domain into the card. The card generated in this manner does not perform well for different user intents associated with queries in a same domain. The system in the present teaching can dynamically build cards, to match with the intent associated with query and provide relevant information on the card, instead of a general purpose static card for all queries. The system according to the present teaching may create cards on the fly by selecting modules and/or layout templates for card construction. The selection of modules and layouts is not predetermined, but may depend on the query, the context and the user's person-centric knowledge. A card may be created by populating the results into the dynamically selected and organized modules. This may provide a different card for each query and each user. The terms "card" and "rich card" may be used interchangeably herein.

In accordance with various embodiments, the system in the present teaching may create intent based cards for presenting: reference data, personal data, or a combination of both. Reference data card may include results from a reference web, e.g. in response to a query "Tom Cruise New Movie." Personal data card may include a user's personal event for notification or reminder, e.g. "Dinner with Josh." An exemplary combination of personal and reference data may be a card created in response to a user's question or query: "Hotel for my Boston Trip." Any of the above mentioned cards may be created dynamically based on the user's estimated intent, the user's preference information, the user's location, the user's device, the user's query, etc.

Figure 16:
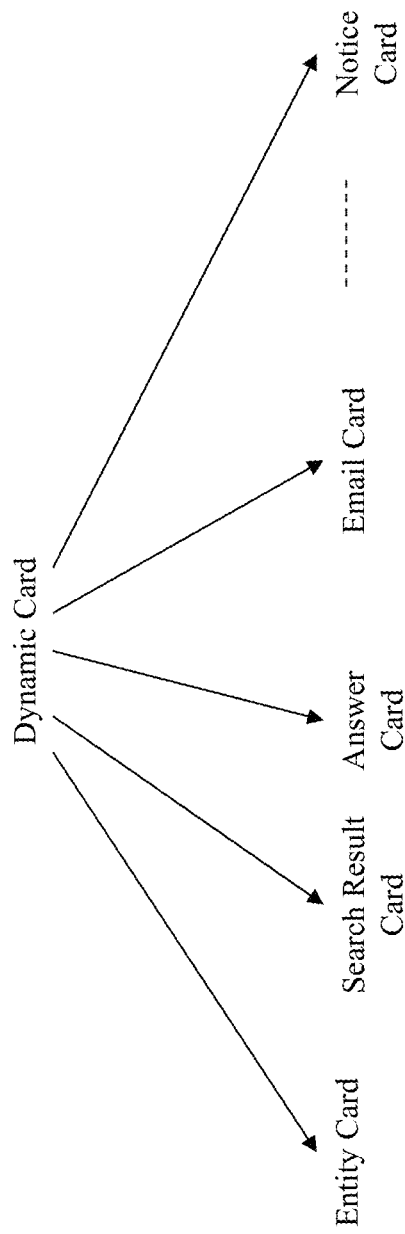
FIG. 16 illustrates examples of different types of dynamic cards, according to an embodiment of the present teaching.

FIG. 16 illustrates examples of different types of dynamic cards, according to an embodiment of the present teaching. A dynamic card disclosed herein may refer to a card that is dynamically generated based on a user's request or an instruction that is generated based on user's estimated intent. As shown in FIG. 16, a dynamic card may be an entity card, a search result card, an answer card, a notice card, or an email card. In one embodiment, the user may refer to the person 102.

An entity card may be a card that provides summary information related to an entity (e.g., a person, a location, a business). A search result card may be a card that provides information about one or more search results related to a query (e.g., the card shown in FIG. 11). An answer card may be a card that provides an answer to a question (e.g., the card shown in FIG. 10). An email card may be a card that provides a summary of an email associated with a user (e.g., the card 1204 shown in FIG. 14). A notice card may be a card that provides a notice to a user (e.g., the card 1218 shown in FIG. 14).

It can be understood that a same card may be treated as different types based on application. In one situation, the card in FIG. 11 may be treated as a search result card in response to the query "amy adams." In another situation, the card in FIG. 11 may be treated as an entity card related to entity "amy adams," without considering any query.

Figure 17:
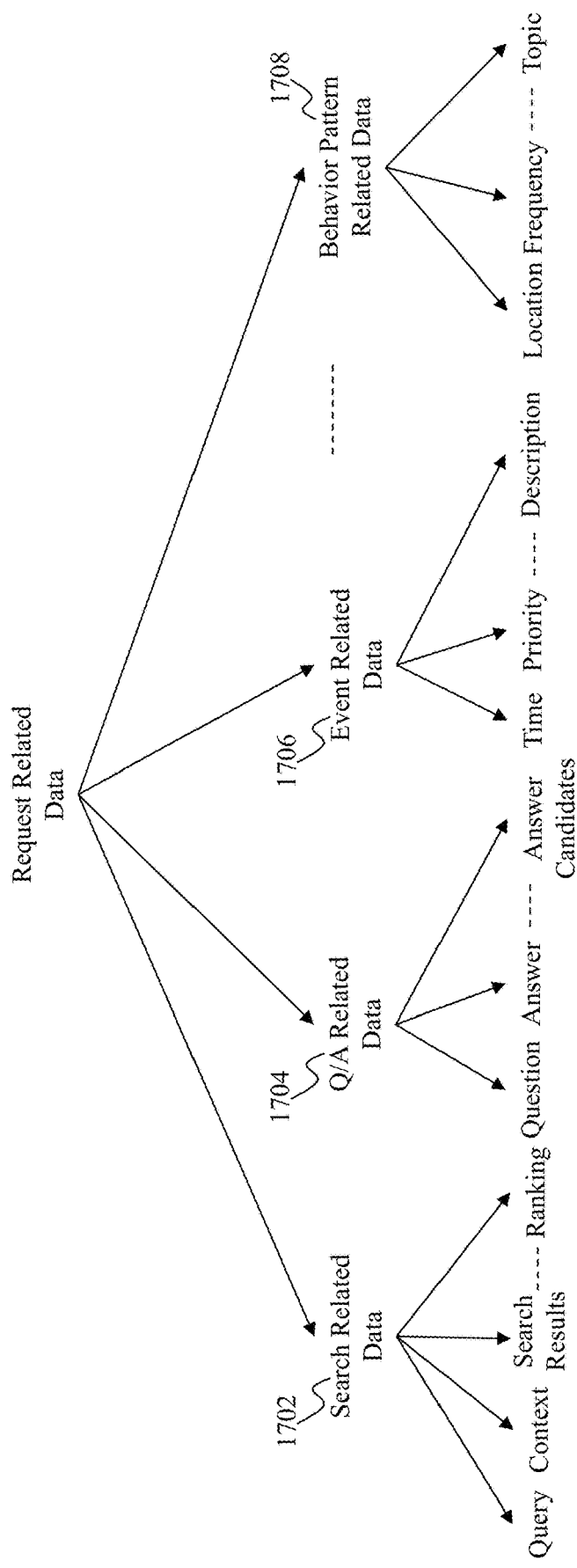
FIG. 17 illustrates examples of different types of request related data, according to an embodiment of the present teaching.

The system in the present teaching may build different cards in response to different requests, based on corresponding request related data. FIG. 17 illustrates examples of different types of request related data, according to an embodiment of the present teaching.

In accordance with a request for a search result card, the system may build the card based on search related data 1702 that may include the query, context of the query, search results matching the query, ranking information of the search results, etc. For example, a search result card may include the top ranked one or more search results related to a query. The system may build the search result card based on context of the query. For example, if the user searches for "cake" after receiving an email reminder that his wife's birthday is on that same day, the system can include in the search result card a list of local stores that are still open and selling birthday cakes.

In accordance with a request for an answer card, the system may build the card based on Q/A related data 1704 that may include the question, the answer to the question, other answer candidates related to the question, etc. For example, in addition to the answer itself, an answer card may also include other candidate answers related to the question.

In accordance with a request for an event related card (e.g., a notice card related to an event or an entity card related to an event), the system may build the card based on event related data 1706 that may include time of the event, priority of the event for the user, description of the event, etc. For example, after receiving a query of "Super Bowl live on TV" from a user, the system can determine that the user has intent to watch Super Bowl game live on TV, while the query is submitted a week before the game. Then, right before the event of "Super Bowl" starts (e.g., one hour before the game is broadcasted on TV), the system can generate and send the user a notice card about the "Super Bowl" game, including time of the game, TV channel to broadcast the game, description of the game, etc.

In accordance with a request for a behavior pattern related card (e.g., a notice card or an email card based on a user's behavior pattern), the system may build the card based on behavior pattern related data 1708 that may include location of the behavior pattern, frequency of the behavior, topic related to the behavior, etc. For example, if a user often searches on Saturday night for new posts on a social network related to a TV show, the system can determine that the user has this behavior pattern if frequency of the behavior is higher than a threshold. Then, on every Saturday night, the system can generate and send the user a notice card or an email card to summarize new posts on the social network related to the TV show, including title of the TV show, a snippet of the new post(s), a link to the social network, etc.

Figure 18:
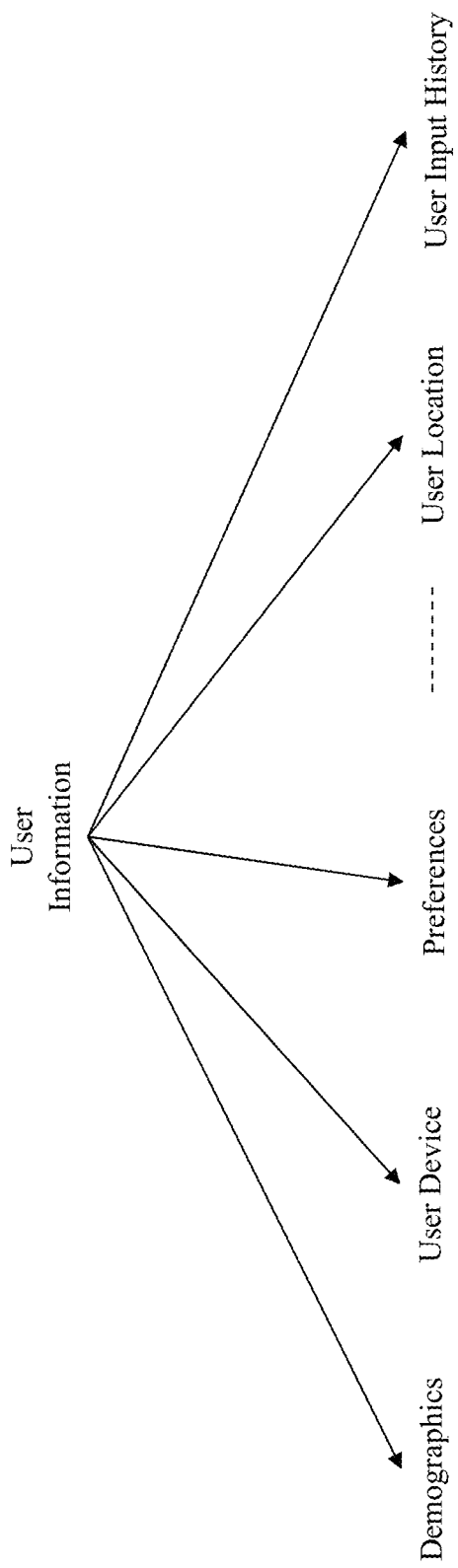
FIG. 18 illustrates examples of user information, according to an embodiment of the present teaching.

FIG. 18 illustrates examples of user information, according to an embodiment of the present teaching. User information may include information about a user of the system. In addition to determining a type of the card request, the system may generate a card for a user based on user information of the user. As shown in FIG. 18, user information associated with a user may include demographic information of the user, device used by the user to access the system, location of the user, user's input history on the system, and the user's preferences. Demographic information of the user may include the user's age, gender, date of birth, etc. User's input history may include the user's input-like queries, questions, clicks on a user interface provided by the system. The user's preferences may include what the user likes to do in general (e.g., the user may like to watch TV at 8 PM, go for a walk in the early morning, or prefer romantic movies).

The system can dynamically select different modules for a card based on the user information. For example, the system may put more modules in a card if the user is using a personal computer and put fewer modules in a card if the user is using a smartphone. In another example, the system may put more images and video links in a card if the user prefers to view cards including images and videos. A module may refer to a portion in a card. While the card is related to a topic, the portion may be related to a sub-topic of the topic. As shown in FIG. 11, the search result card 1100 related to an actor includes a header module, a bio module, and a movies module.

It can be understood that a piece of information may be both related to the user and a request for a card. For example, a user's behavior pattern may be utilized to trigger a request for a notice card and be utilized as the user's information for dynamically building the card.

In general, the system in the present teaching can build a card for a user, based on an estimated intent of the user. The intent of the user may be estimated based on the user's input (e.g., the user's query, question), request related data, contexts of the input, and/or user information of the user. In one example, the system can clearly determine a user's intent based on the user's input (e.g., a query of "make a reservation at restaurant McDonald"). In another example, after receiving a query of "restaurant McDonald," the system can utilize information of context, user preference, user history, etc. to determine the user's intent. The intent may be "where is the closest McDonald", "how to go there", or "McDonald office hour", etc. The intent may be dynamically changing, according to time, user location, user input, etc. Accordingly, the system may dynamically generate a card for a user, with dynamically selected modules and layout, based on most updated intent of the user.

Figure 19:
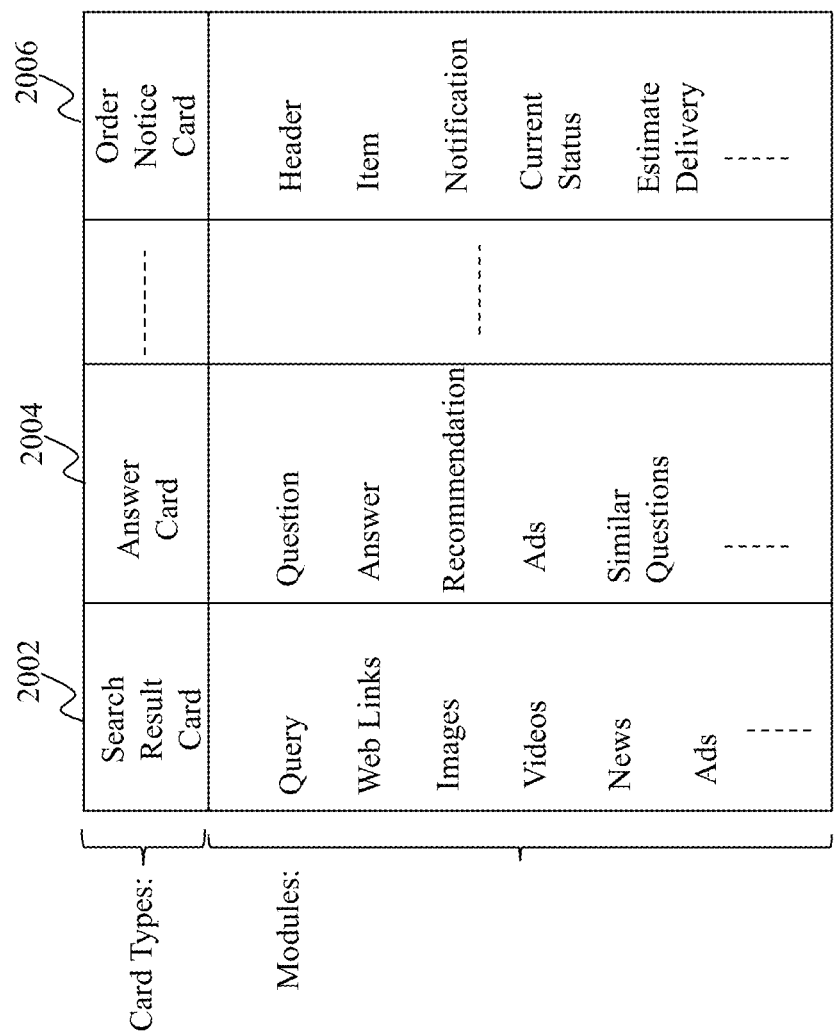
FIG. 19 illustrates examples of module candidates classified based on different card types, according to an embodiment of the present teaching.

FIG. 19 illustrates examples of module candidates classified based on different card types, according to an embodiment of the present teaching. For example, for a search result card 2002, potential modules that may be put into the card comprise modules of: query, web links of search results, images about the search results, videos about the search results, news matching the query, ads related to the query or search results, etc. For an answer card 2004, potential modules that may be put into the card comprise modules of: question, answer to the question, recommendation related to the question (e.g., recommendation of a service provider if the question is where to get a service), ads related to the question, similar questions, etc. For an order notice card 2006, potential modules that may be put into the card comprise modules of: header, item of the order, notification about the order, current status of the order, and estimate delivery of the order, etc.

As discussed above, the system may dynamically select modules and a layout to build a card corresponding to a card type. For example, after receiving a request for a search result card, the system may select one or more modules from the modules listed under search result card 2002 in FIG. 19. The selection may be based on the user's estimated intent, the user's preference information, the user's location, the user's device, the user's query, etc. In one embodiment, the search result card may also include a module from an order notice card, when the system determines that the user's intent is to search for status of an order. In another embodiment, the system may generate and provide multiple cards together to a user. For example, the system may generate a search result card and a notice card about an order, when the system estimates that the user's intent may be either to search for a query or to search for status of an order.

Figure 20:
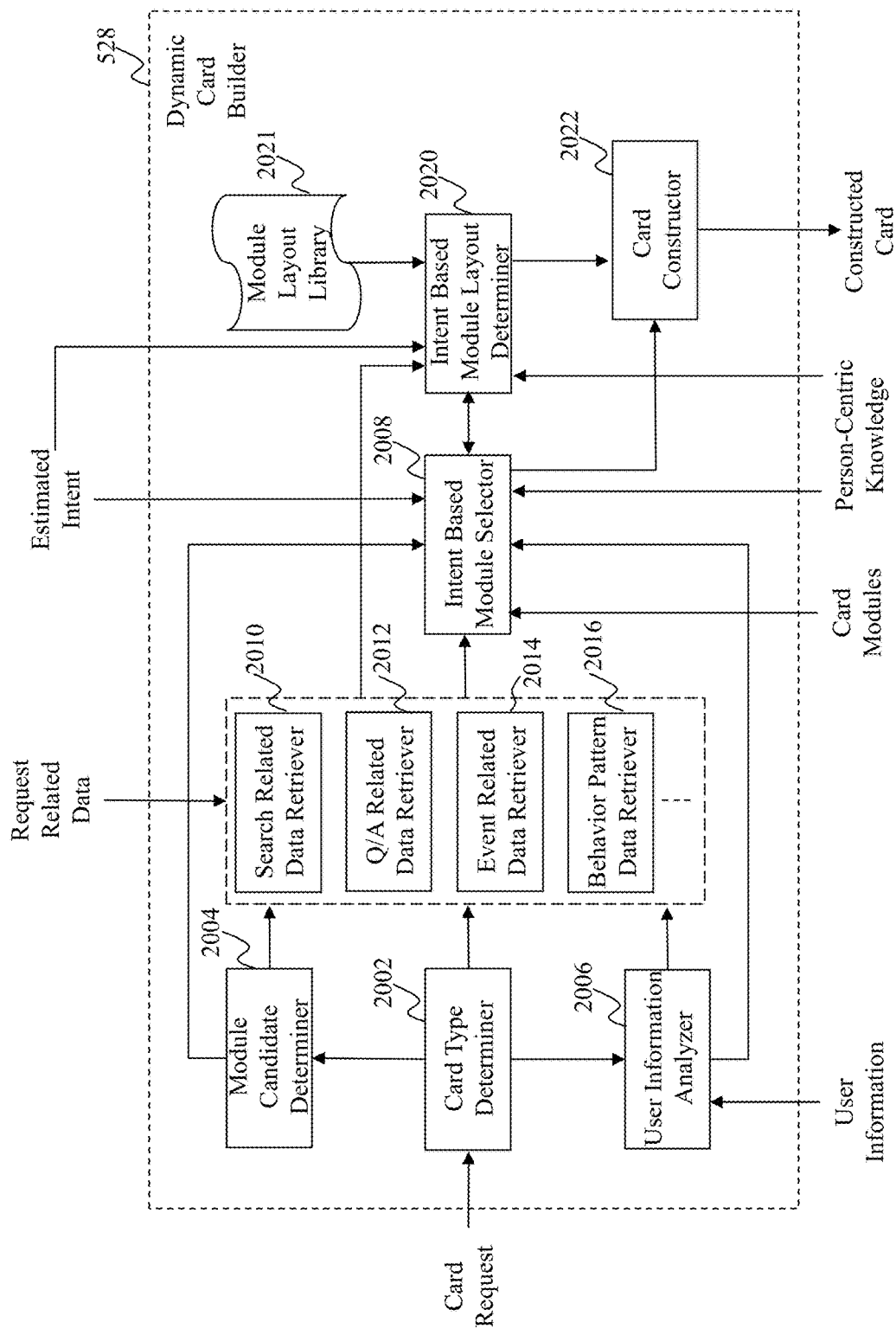
FIG. 20 shows an exemplary system diagram of a dynamic card builder, according to an embodiment of the present teaching.

FIG. 20 shows an exemplary system diagram of a dynamic card builder 528, according to an embodiment of the present teaching. The dynamic card builder 528 in this example is configured for building a card on-the-fly for a user by selecting suitable card layout and/or modules from the card module database 536, based on a card request and the estimated intent of the user.

The dynamic card builder 528 in this example includes a card type determiner 2002, a module candidate determiner 2004, a user information analyzer 2006, an intent based module selector 2008, a plurality of data retrievers, an intent based module layout determiner 2020, a module layout library 2021, and a card constructor 2022. The plurality of data retrievers may include but not limited to: a search related data retriever 2010, a Q/A related data retriever 2012, an event related data retriever 2014, a behavior pattern data retriever 2016.

The card type determiner 2002 in this example receives a request for building a card to be presented to a user. The request may be from the search engine 516, the Q/A engine 518, the task generation engine 520, or the person-centric knowledge retriever 526. The card type determiner 2002 may determine a card type for the card to be built, based on the request. The card types may include an entity card, a search result card, an answer card, a notice card, an email card, etc., as shown in FIG. 16. The card type determiner 2002 may send the determined card type to the module candidate determiner 2004, the user information analyzer 2006, and one of the data retrievers. For example, if the card type determiner 2002 determines that the request is for generating a search result card, the card type determiner 2002 may send the card type information to the search related data retriever 2010 for retrieving search related data (e.g., from the search engine 516). In another example, if the card type determiner 2002 determines that the request is for generating an answer card, the card type determiner 2002 may send the card type information to the Q/A related data retriever 2012 for retrieving Q/A related data (e.g., from the Q/A engine 518). In yet another example, if the card type determiner 2002 determines that the request is for generating a notice card about an event, the card type determiner 2002 may send the card type information to the event related data retriever 2014 for retrieving data related to the event, e.g., from the person-centric knowledge retriever 526 or directly from the person-centric knowledge database 532 or the person-centric space 200. In still another example, if the card type determiner 2002 determines that the request is for generating a notice card based on the user's behavior pattern, the card type determiner 2002 may send the card type information to the behavior pattern data retriever 2016 for retrieving data related to the behavior pattern, e.g., from the person-centric knowledge retriever 526 or directly from the person-centric knowledge database 532 or the person-centric space 200.

The module candidate determiner 2004 in this example determines one or more module candidates based on the card type. For example, to create an answer card in response to a question, the module candidate determiner 2004 may determine the modules: question, answer, recommendation, ads, similar questions, etc., as shown in FIG. 19, as the candidates to be selected for building the answer card. The module candidate determiner 2004 may send the module candidates to the data retriever determined by the card type determiner 2002, for retrieving corresponding data. The module candidate determiner 2004 may also send the module candidates to the intent based module selector 2008 for selecting one or more modules to be put into the card.

The user information analyzer 2006 in this example can analyze user information of the user. As described above, the user information may include the user's demographics, device, preferences, location, input history, etc. The user information may also be utilized for selecting modules to be put into the card. The user information analyzer 2006 may send the user information to the data retriever determined by the card type determiner 2002, for retrieving corresponding data. The user information analyzer 2006 may also send the user information to the intent based module selector 2008 for selecting one or more modules to be put into the card.

The data retrievers 2010-2016 may retrieve request-related data from corresponding data sources. As described above, based on a card type, one of the data retrievers may retrieve data related to the card type and the request. For example, the Q/A related data retriever 2012 may retrieve Q/A related data when the card type is an answer card. In addition, the data retriever (e.g., the Q/A related data retriever 2012) may also retrieve data based on the user information from the user information analyzer 2006 and/or the module candidates from the module candidate determiner 2004. For example, the Q/A related data retriever 2012 may retrieve information about ads related to the question, if the module candidate determiner 2004 determines that ads may be put into the answer card. In another example, the Q/A related data retriever 2012 may retrieve more related answer and related questions, if the user information analyzer 2006 determines that the user's device has a big screen. Each data retriever may send the retrieved data to the intent based module selector 2008 for module selection, and to the intent based module layout determiner 2020 for layout determination.

The intent based module selector 2008 may obtain estimated intent about the user to determine more module candidates for building the card. These module candidates may be determined based on a domain of knowledge related to the estimated intent. For example, if the user is searching for flight information, modules about Airline, Flight Schedule, Destination, etc. may also be put into the search result card. The intent based module selector 2008 may integrate these module candidates together and select one or more modules for the card construction. In general, the estimated intent of the user may be estimated based on the user's input (e.g., the user's query, question), request related data, contexts of the input, and/or user information of the user. If the user's intent is estimated to find a local theater having a specific movie, then the intent based module selector 2008 may select modules about some local theater's information (e.g., address and movie show time) even if the user submitted query merely includes the movie's name.

The intent based module selector 2008 may rank the module candidates based on the estimated intent, the request related data, the user information, and/or person-centric knowledge of the user. The person-centric knowledge of the user may include information (e.g., entities and their relationships) extracted from the user's person-centric space (e.g., from the user's emails, online posts, online shopping behaviors, etc.).

In one embodiment, the intent based module selector 2008 may also filter the card module candidates based on some layout metadata determined by the intent based module layout determiner 2020. For example, the intent based module layout determiner 2020 may determine that there can be no more than three modules in the card to be presented to the user, either based on the user's device or based on the user's preference. In that case, the intent based module selector 2008 may filter the module candidates to leave only the top three ranked modules.

The intent based module selector 2008 may send the selected modules to the intent based module layout determiner 2020 for layout design, and to the card constructor 2022 for constructing the card.

The intent based module layout determiner 2020 in this example may also obtain the estimated intent of the user, the person-centric knowledge of the user, and the request related data. Based on these obtained information, the intent based module layout determiner 2020 may determine a layout for the selected modules, based on a layout template in the module layout library 2021. For example, the user's intent is estimated to view a trailer of a movie before making a decision whether to see the movie in theater. In that case, after receiving a query including the movie's name from the user, the intent based module selector 2008 can select a video module for showing the trailer of this movie and the intent based module layout determiner 2020 may design the card such that the video module is put on top of the other modules.

In one embodiment, if the user is determined to have a preference regarding to a specific layout (e.g., a specific color, font, module size), the intent based module layout determiner 2020 may store the specific layout as a template to the module layout library 2021. Then when a card is requested to be built for the user, the intent based module layout determiner 2020 can design a card based on that specific layout template.

In another embodiment, if the user is determined to prefer very few modules in a card, the intent based module layout determiner 2020 may send an upper limit on the number of modules to the intent based module selector 2008 for module selection.

In yet another embodiment, the intent based module selector 2008 and the intent based module layout determiner 2020 can work iteratively. For example, after the intent based module selector 2008 selects a group of modules, the intent based module layout determiner 2020 determines some layout metadata and sends the metadata back to the intent based module selector 2008 for further selecting a sub-group of modules from the group. This iteration may go on until a pre-determined criterion is met, e.g., when the number of modules is reduced to be equal to or less than a give threshold.

The intent based module layout determiner 2020 may send the determined layout to the card constructor 2022. The card constructor 2022 may also obtain the selected modules from the intent based module selector 2008. The card constructor 2022 can construct a card based on the selected modules and the determined layout. In one embodiment, the card constructor 2022 can obtain information to be put into the modules from the intent based module selector 2008, which obtains the information from a corresponding data retriever. In that case, the card constructor 2022 may directly generate a card with information filled in, and send the card to a corresponding engine (e.g., a search engine or a Q/A engine) or send directly to the user. In another embodiment, the card constructor 2022 may just build a card frame without filling in the information and send constructed card frame to a corresponding engine (e.g., a search engine or a Q/A engine) that can fill the information into the card and provide the card to the user.

In another embodiment, the card constructor 2022 may provide the constructed card to the knowledge engine 530 for updating person-centric knowledge about the user.

Figure 21:
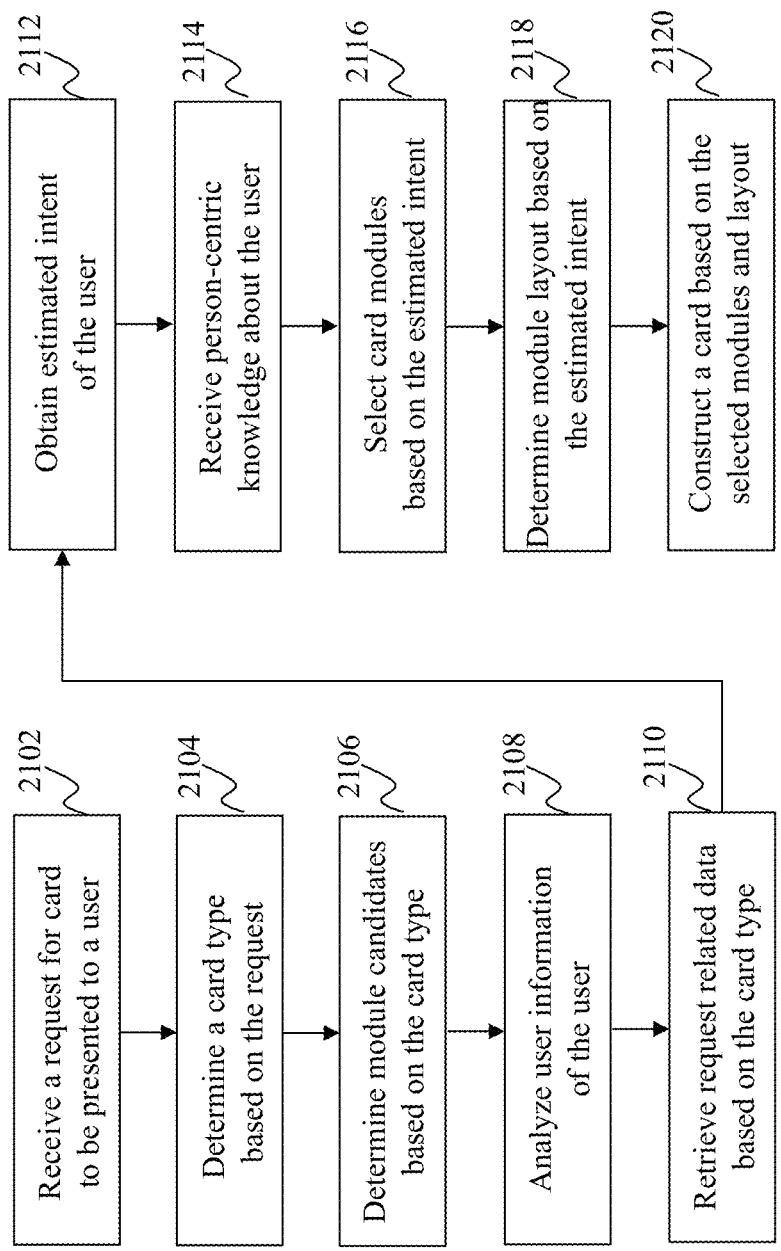
FIG. 21 shows a flow chart of an exemplary process performed by a dynamic card builder, according to an embodiment of the present teaching.

FIG. 21 shows a flow chart of an exemplary process performed by a dynamic card builder, according to an embodiment of the present teaching. At 2102, a request is received for generating a card to be presented to a user. A card type is determined at 2104 based on the request. Module candidates are determined at 2106 based on the card type. At 2108, user information of the user is analyzed. Request related data are retrieved at 2110 based on the card type.

Estimated intent of the user is obtained at 2112. Person-centric knowledge about the user is received at 2114. Card modules are selected at 2116 based on the estimated intent. A module layout is determined at 2118 based on the estimated intent. A corresponding card is constructed at 2120 based on the selected modules and the determined layout.

Figure 22:
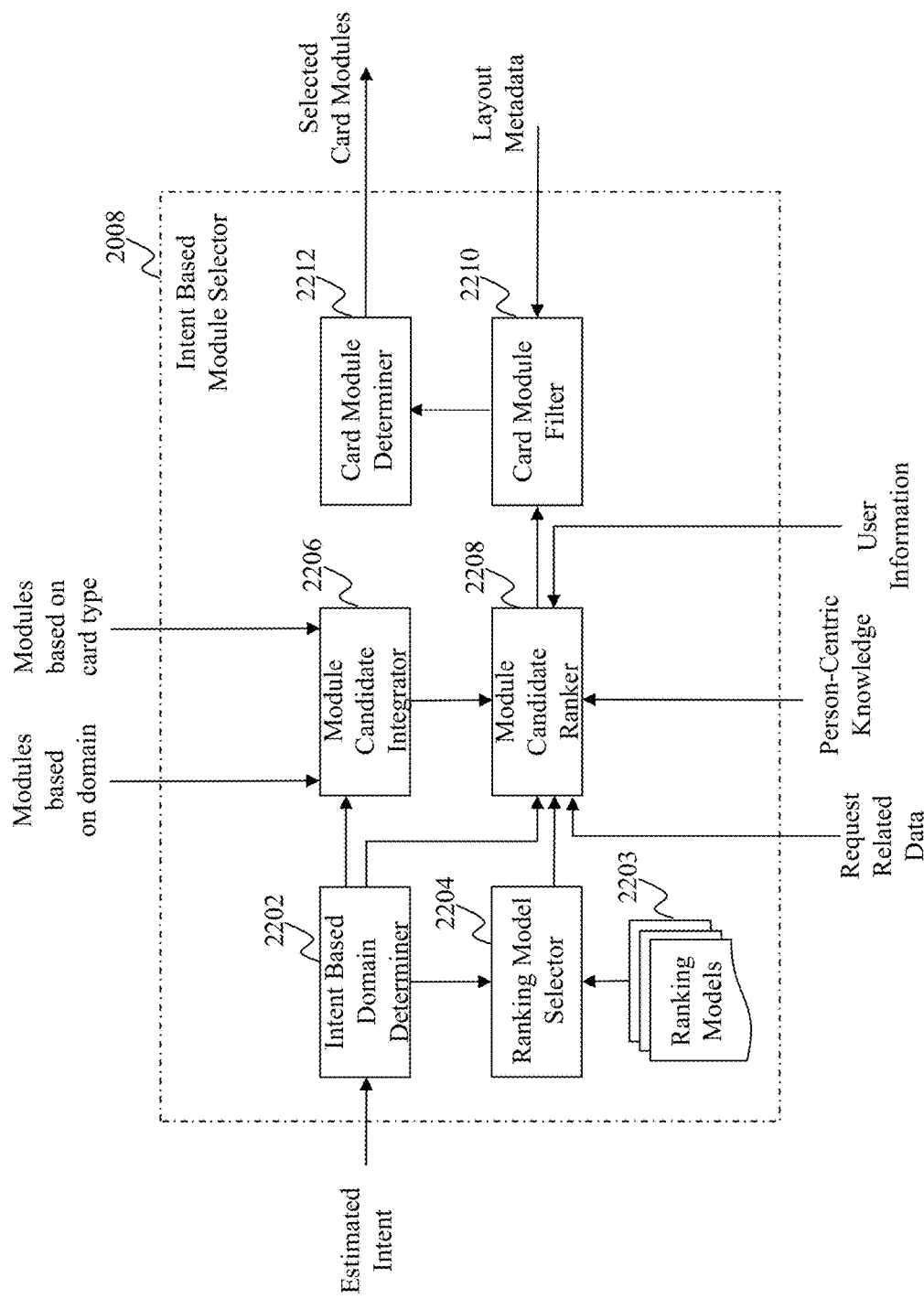
FIG. 22 shows an exemplary system diagram of an intent based module selector, according to an embodiment of the present teaching.

FIG. 22 shows an exemplary system diagram of an intent based module selector 2008, according to an embodiment of the present teaching. The intent based module selector 2008 in this example includes an intent based domain determiner 2202, a ranking model selector 2204, one or more ranking models 2203, a module candidate integrator 2206, a module candidate ranker 2208, a card module filter 2210, and a card module determiner 2212.

The intent based domain determiner 2202 in this example can obtain estimated intent of the user (e.g., from the intent engine 524). The intent based domain determiner 2202 may determine a domain based on the estimated intent. A domain of knowledge may be determined based on the user's estimated intent or what the user intended to do. The determined domain can also indicate module candidates to be put into a card for the user. For example, if the user is estimated to be interested in an actor, the intent based domain determiner 2202 may determine a domain of "actor" for the card to be presented to the user; and if the user is estimated to be interested in a trip, the intent based domain determiner 2202 may determine a domain of "trip" for the card.

Figure 23:
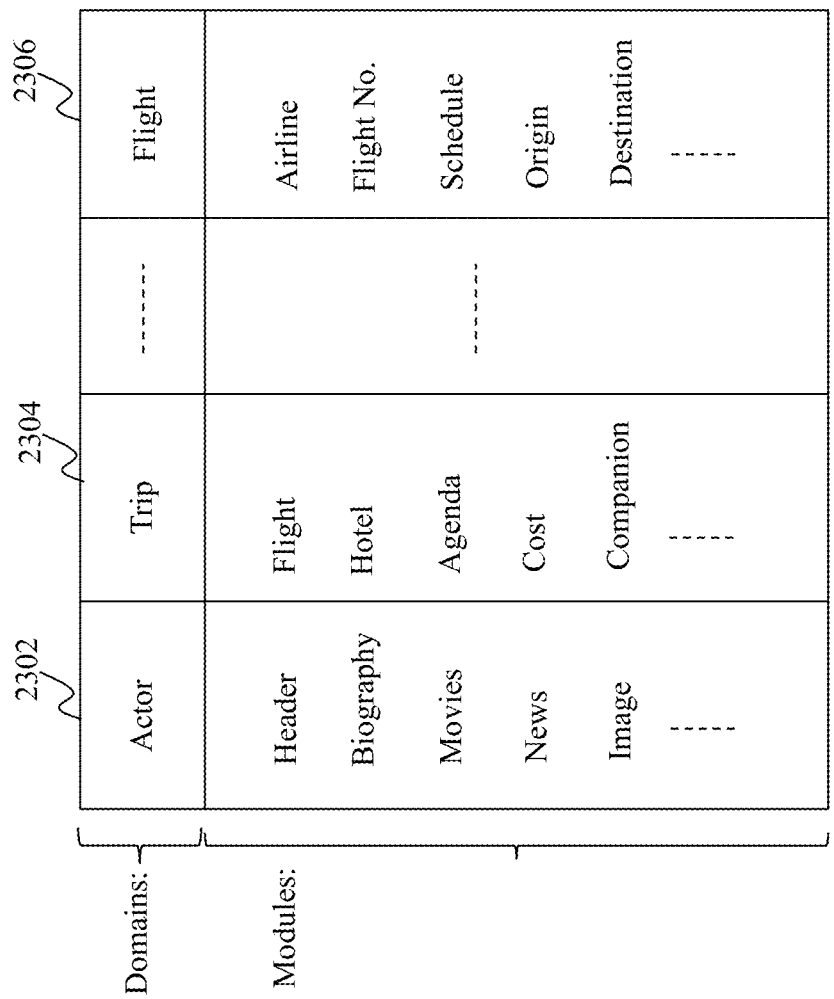
FIG. 23 illustrates examples of module candidates classified based on different domains, according to an embodiment of the present teaching.

FIG. 23 illustrates examples of module candidates classified based on different domains, according to an embodiment of the present teaching. As shown in FIG. 23, for the domain of "Actor" 2302, module candidates that may be put into a card may include Header, Biography, Movies, News, Image, etc., that are all related to a same actor; for the domain of "Trip" 2304, module candidates that may be put into a card may include Flight, Hotel, Agenda, Cost, Companion, etc., that are all related to the trip.

In one embodiment, one domain may be a sub-domain of another. For example, the domain of "Flight" 2306 may be a sub-domain of the domain of "Trip" 2304. In one example, a user is estimated to be interested in a specific flight, instead of a whole trip, e.g., when the user has not decided for the trip or when the user is booking flight for another person. Then the intent based domain determiner 2202 may determine a domain of interest for the user is "Flight" rather than "Trip". As shown in FIG. 23, for the domain of "Flight" 2306, module candidates that may be put into a card may include Airline, Flight No., Schedule, Origin, Destination, etc.

Referring back to FIG. 22, the intent based domain determiner 2202 may determine a domain for the user with respect to the card, and send the domain information to the module candidate integrator 2206 for module candidate integration and to the ranking model selector 2204 for selecting a ranking model.

The module candidate integrator 2206 in this example can retrieve card module candidates from the card module DB 536, based on the determined domain as shown in FIG. 23 and/or based on the card type as shown in FIG. 19. When module candidates are retrieved based on both, the module candidate integrator 2206 may integrate them, e.g., by putting them together as a candidate pool for module selection. The module candidate integrator 2206 may then send the candidate pool to the module candidate ranker 2208 for ranking.

The module candidate ranker 2208 may rank the module candidates in the pool based on one or more types of information (e.g., the estimated intent, the determined domain, the request related data, the user information, and/or the person-centric knowledge of the user). The module candidate ranker 2208 may perform the ranking based on a ranking model selected by the ranking model selector 2204. A ranking model may specify how to determine a rank for a module candidate, e.g., what types of the above mentioned information should be considered, how much weight should be assigned to each type. The ranking model selector 2204 can select one of the ranking models 2203 based on the determined domain. For example, if the domain is "Actor", a ranking model may be selected to put more weight on request related data than user information of the user. In another embodiment, the ranking model selector 2204 may select one of the ranking models 2203 based on the estimated intent. For example, if the user's intent is estimated to find some recent movies interesting to the user, a ranking model may be selected to put more weight on person-centric knowledge and user information of the user than other types of information.

After the module candidate ranker 2208 ranks the module candidates integrated by the module candidate integrator 2206 based on the selected ranking model, the module candidate ranker 2208 may send the ranked module candidates to the card module filter 2210 for filtering. The card module filter 2210 may be an optional component and may filter out some module candidates based on layout metadata from the intent based module layout determiner 2020. For example, if the layout metadata indicates that each module's size cannot be larger than a threshold, the card module filter 2210 may filter out some modules with big sizes, e.g., some video or image modules. This filtering may or may not be based on the ranking. The card module filter 2210 may then send the filtered module candidates to the card module determiner 2212, maybe with a new ranking after the filtering.

The card module determiner 2212 in this example can determine one or more modules to be put into the card, based on the ranked and filtered card module candidates. In one embodiment, the card module determiner 2212 may determine a fixed number of module(s) ranked on top to be put into the card. In another embodiment, the card module determiner 2212 may determine a fixed percentage of the modules ranked on top to be put into the card. In other embodiments, the number or percentage of modules to be selected by the card module determiner 2212 is not fixed, but is dynamically determined based on the user's estimated intent, the determined domain, the request related data, the user information, and/or the person-centric knowledge of the user. The card module determiner 2212 may send the selected card modules to the card constructor 2022 for card construction.

Figure 24:
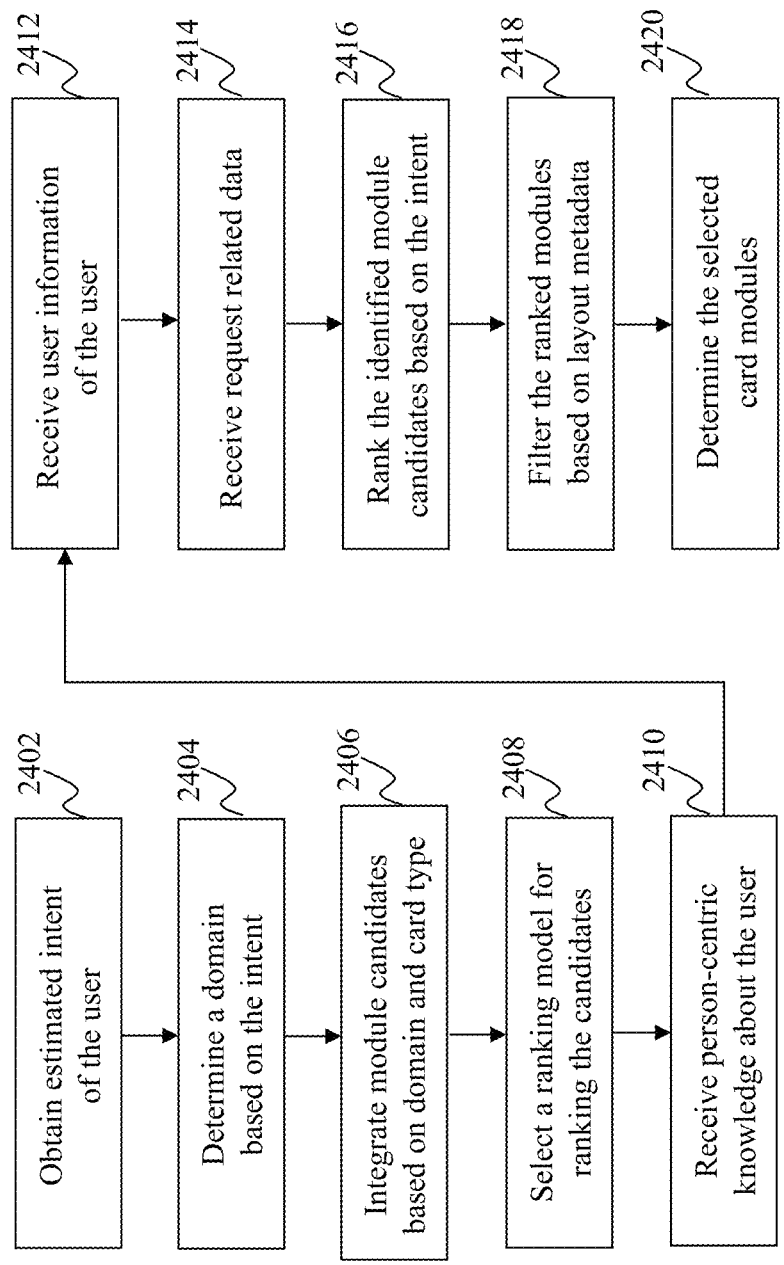
FIG. 24 shows a flow chart of an exemplary process performed by an intent based module selector, according to an embodiment of the present teaching.

FIG. 24 shows a flow chart of an exemplary process performed by an intent based module selector, according to an embodiment of the present teaching. At 2402, estimated intent of the user is obtained. A domain is determined at 2404 based on the intent. Module candidates based on the domain and the card type are integrated at 2406. A ranking model is selected for ranking the candidates at 2408. At 2410, person-centric knowledge about the user is received. User information of the user is received at 2412. Request related data is received at 2414. The identified or integrated module candidates are ranked based on the intent at 2416. The ranked modules are optionally filtered at 2418 based on layout metadata. The selected card modules are determined at 2420 to be put into a card.

Figure 25:
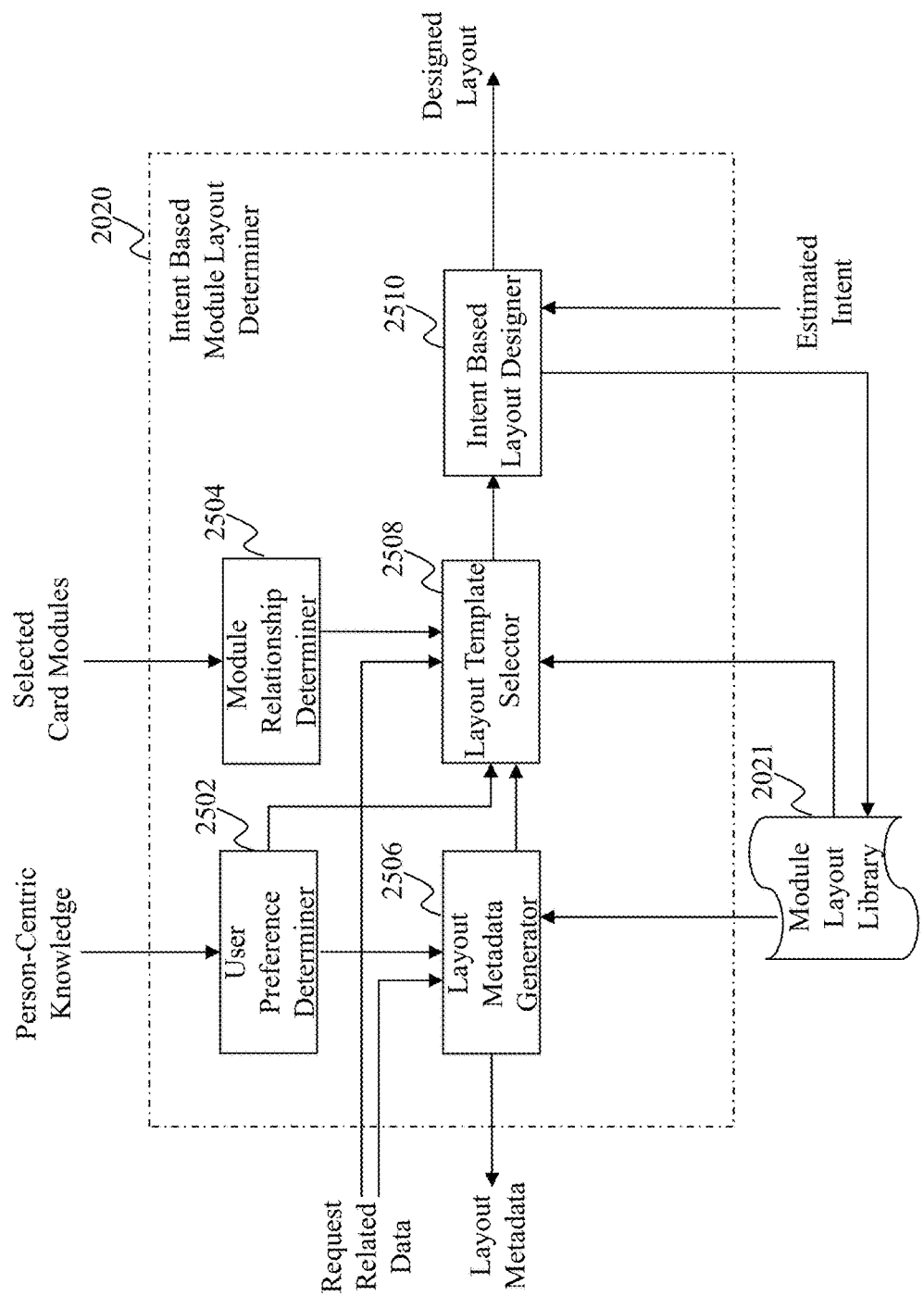
FIG. 25 shows an exemplary system diagram of an intent based module layout determiner, according to an embodiment of the present teaching.

FIG. 25 shows an exemplary system diagram of an intent based module layout determiner 2020, according to an embodiment of the present teaching. The intent based module layout determiner 2020 in this example includes a user preference determiner 2502, a module relationship determiner 2504, a layout metadata generator 2506, a layout template selector 2508, and an intent based layout designer 2510.

The user preference determiner 2502 in this example may receive person-centric knowledge about the user and can determine user preference about card layout based on the person-centric knowledge. For example, the person-centric knowledge may indicate that the user gives a higher click through rate for a layout with a video module on top of the card. In another example, the person-centric knowledge may indicate that the user gives a longer dwell time when the card includes less than five modules. In one embodiment, the user preference determiner 2502 may also determine the user preference information based on user information shown in FIG. 18 and/or user's behavior pattern shown in FIG. 17. The preference information may help to generate some layout metadata for module selection and to select a layout template for card design.

The layout metadata generator 2506 in this example may utilize the user preference information determined at 2502 to generate layout metadata for module selection at 2008. For example, if the user is determined to prefer a specific type of layout, the system may have stored the specific layout in the module layout library 2021, such that the layout metadata generator 2506 can retrieve it directly from the module layout library 2021 when a card is to be constructed for the user. In one embodiment, the layout metadata generator 2506 may retrieve a specific layout based on request related data. For example, the module layout library 2021 may store different module layouts classified based on different card types or different request related data.

The layout metadata generator 2506 can then generate some metadata related to the specific layout (e.g., the number of modules, the location of the modules, each module's color, font, size). The layout metadata generator 2506 can send the generated metadata to the intent based module selector 2008 for module selection. As discussed above, this can be an iterative process including the module selection at the intent based module selector 2008 and the layout design at the intent based module layout determiner 2020. The layout metadata generator 2506 may also send the generated metadata to the layout template selector 2508 for layout template selection.

The layout template selector 2508 may select a layout template from the module layout library 2021 based on the user preference determined at the user preference determiner 2502, the layout metadata generated at the layout metadata generator 2506, the request related data, and/or relationships between the selected modules.

The module relationship determiner 2504 in this example can receive information about the selected card modules from the intent based module selector 2008 and determine relationships between them. For example, based on ranking information of the selected card modules, the module relationship determiner 2504 may determine how to put the selected card modules in a card (e.g., which module should have a larger size than others, or which module should be put on top of others). In another example, the module relationship determiner 2504 may determine that two of the selected card modules, e.g., module "flight origin" and module "flight destination," should be put close to each other in the card. The module relationship determiner 2504 may send the module relationship information to the layout template selector 2508 for layout template selection.

In one embodiment, the user preference information may indicate clearly a specific layout template to be selected for the user, such that the layout template selector 2508 can directly select that template from the module layout library 2021, without consideration of the request related data or the module relationships.

In another embodiment, the user preference information may indicate that a group of layout templates are appropriate for the user. Then the layout template selector 2508 may select one layout template from the group, taking into consideration of the request related data, the module relationships, and/or the generated layout metadata.

The layout template selector 2508 may send the selected layout template to the intent based layout designer 2510 for layout design. Even if the same query is submitted again by the same user, the user's estimated intent may be different. The intent based layout designer 2510 can dynamically design a card layout based on the estimated intent of the user. For example, a user may be estimated to be interested in more images of an actor, after viewing an image of the actor in an entity card. In that case, the intent based layout designer 2510 may design a new layout of the entity card about the actor, based on the previous layout (e.g., by enlarging the image module size or putting the images of the actor on top of other modules in the new layout). The intent based layout designer 2510 may send the designed layout to the card constructor 2022 for card construction, or store the designed layout in the module layout library 2021 for future use.

Figure 26:
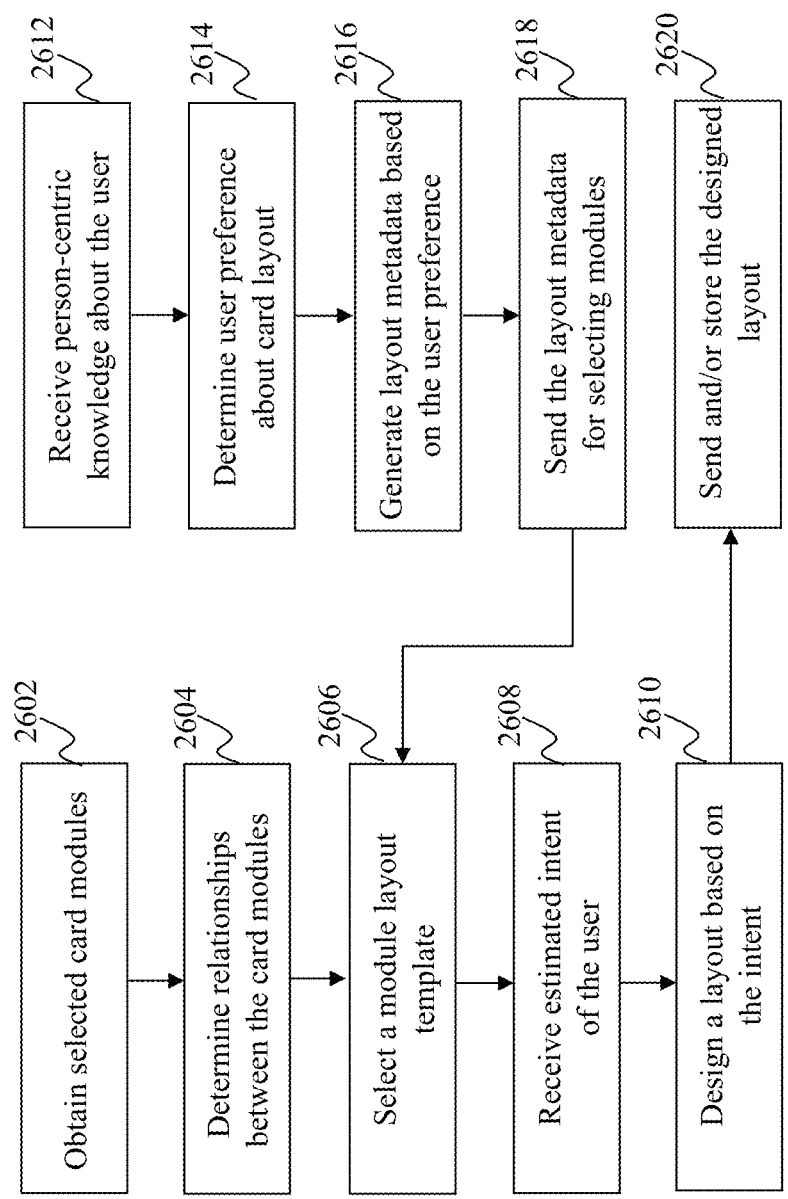
FIG. 26 shows a flow chart of an exemplary process performed by an intent based module layout determiner, according to an embodiment of the present teaching.

FIG. 26 shows a flow chart of an exemplary process performed by an intent based module layout determiner, according to an embodiment of the present teaching. At 2602, selected card modules are obtained. Relationships between the card modules are determined at 2604. The process then goes to 2606.

As shown FIGS. 26, 2612 to 2618 may be performed in parallel to 2602-2604. At 2612, person-centric knowledge about the user is received. User preference about card layout is determined at 2614. Layout metadata is generated at 2616 based on the user preference. At 2618, the layout metadata is sent for selecting modules. The process then goes to 2606.

A module layout template is selected at 2606. Estimated intent of the user is received at 2608. A layout is designed at 2610 for the card based on the intent. Then at 2612, the designed layout is sent for card construction and/or stored for future use.

Figure 27:
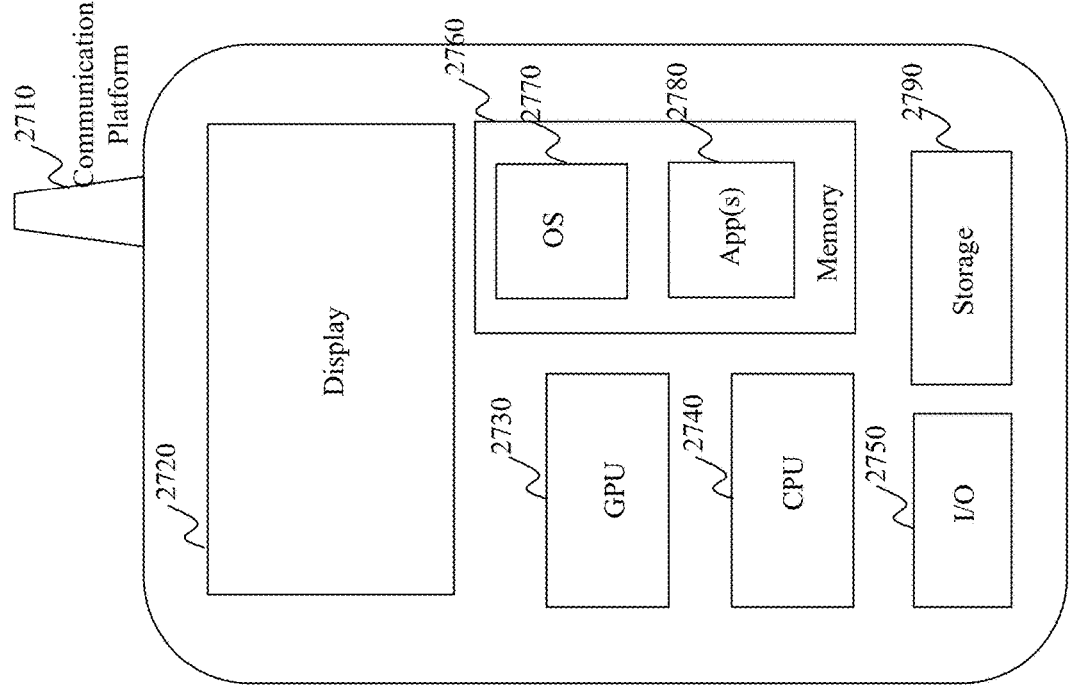
FIG. 27 depicts the architecture of a mobile device which can be used to implement a specialized system incorporating the present teaching.

FIG. 27 depicts the architecture of a mobile device which can be used to realize a specialized system implementing the present teaching. In this example, the user device on which cards are presented and interacted-with is a mobile device 2700, including, but not limited to, a smart phone, a tablet, a music player, a handled gaming console, a global positioning system (GPS) receiver, and a wearable computing device (e.g., eyeglasses, wrist watch), or in any other form. The mobile device 2700 in this example includes one or more central processing units (CPUs) 2740, one or more graphic processing units (GPUs) 2730, a display 2720, a memory 2760, a communication platform 2710, such as a wireless communication module, storage 2790, and one or more input/output (I/O) devices 2750. Any other suitable component, including but not limited to a system bus or a controller (not shown), may also be included in the mobile device 2700. As shown in FIG. 27, a mobile operating system 2770 (e.g., iOS, Android, Windows Phone), and one or more applications 2780 may be loaded into the memory 2760 from the storage 2790 in order to be executed by the CPU 2740. The applications 2780 may include a browser or any other suitable mobile apps for receiving cards on the mobile device 2700. User interactions with the cards or other content items may be achieved via the I/O devices 2750 and provided to the person-centric index system 200.

To implement various modules, units, and their functionalities described in the present disclosure, computer hardware platforms may be used as the hardware platform(s) for one or more of the elements described herein (e.g., the dynamic card builder 528 and/or other components of the person-centric index system 200 described with respect to FIGS. 1-26). The hardware elements, operating systems, and programming languages of such computers are conventional in nature, and it is presumed that those skilled in the art are adequately familiar therewith to adapt those technologies to dynamically generating a card based on user intent as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment, and as a result the drawings should be self-explanatory.

Figure 28:
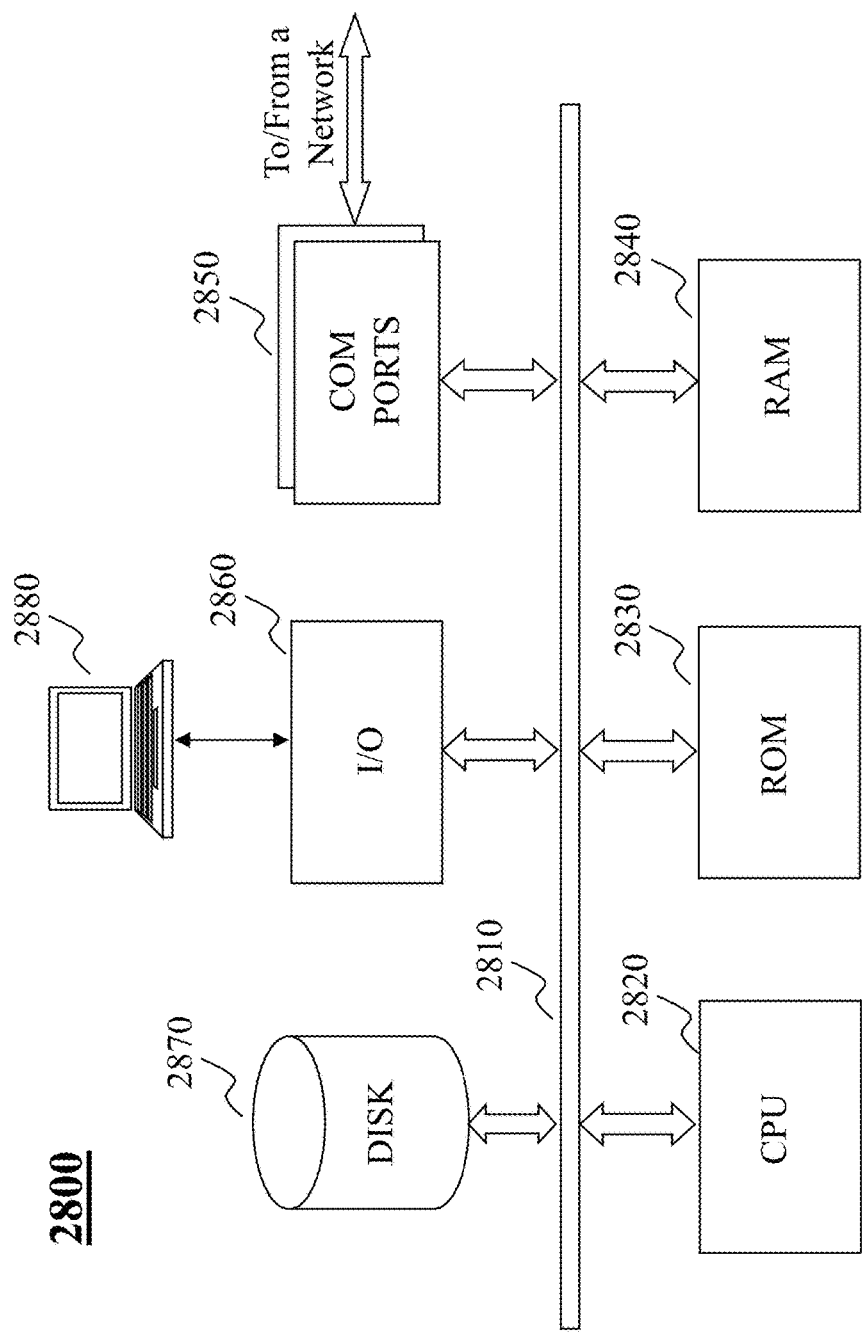
FIG. 28 depicts the architecture of a computer which can be used to implement a specialized system incorporating the present teaching.

FIG. 28 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2800 may be used to implement any component of the intent based dynamic card construction techniques, as described herein. For example, the dynamic card builder 528, etc., may be implemented on a computer such as computer 2800, via its hardware, software program, firmware, or a combination thereof. Although only one such computer is shown, for convenience, the computer functions relating to intent based dynamic card construction as described herein may be implemented in a distributed fashion on a number of similar platforms, to distribute the processing load.

The computer 2800, for example, includes COM ports 2850 connected to and from a network connected thereto to facilitate data communications. The computer 2800 also includes a central processing unit (CPU) 2820, in the form of one or more processors, for executing program instructions. The exemplary computer platform includes an internal communication bus 2810, program storage and data storage of different forms, e.g., disk 2870, read only memory (ROM) 2830, or random access memory (RAM) 2840, for various data files to be processed and/or communicated by the computer, as well as possible program instructions to be executed by the CPU. The computer 2800 also includes an I/O component 2860, supporting input/output flows between the computer and other components therein such as user interface elements 2880. The computer 2800 may also receive programming and data via network communications.

Hence, aspects of the methods of intent based dynamic card construction, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with intent based dynamic card construction. Thus, another type of media that may bear the software elements includes optical, electrical and electromagnetic waves, such as used across physical interfaces between local devices, through wired and optical landline networks, and over various air-links. The physical elements that carry such waves, such as wired or wireless links, optical links, or the like, also may be considered as media bearing the software. As used herein, unless restricted to tangible "storage" media, terms such as computer or machine-"readable medium" refer to any medium that participates in providing instructions to a processor for execution.

Hence, a machine-readable medium may take many forms, including but not limited to, a tangible storage medium, a carrier wave medium, or a physical transmission medium. Non-volatile storage media include, for example, optical or magnetic disks, such as any of the storage devices in any computer(s) or the like, which may be used to implement the system, or any of its components as shown in the drawings. Volatile storage media include dynamic memory, such as a main memory of such a computer platform. Tangible transmission media include coaxial cables and copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer-readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the intent based dynamic card construction as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on a machine having at least one processor, storage, and a communication platform connected to a network for generating a card, the method comprising:
cross-linking, by one or more cross-linking keys, across a private space, a semi-private space, and a public space to create a person-centric space for a user, wherein the one or more cross-linking keys are identified from the private space;
receiving a request for a card to be generated for the user;
selecting, based on a type of the card, one set of module candidates from a plurality of different sets of module candidates;
estimating an intent of the user based on an input from the user and the person-centric space;
determining a plurality of additional module candidates based on the intent;
integrating the selected one set of module candidates and the plurality of additional module candidates;
selecting dynamically, from the integrated module candidates, one or more modules to be put into the card based on a type of device operated by the user;
determining, for each module, a location within the card where the module is to be placed based on a relationship of content included in the module with content included in other modules; and
generating the card based on the selected one or more modules and the determined locations.

2. The method of claim 1, further comprising:
obtaining, from the person-centric space, dynamic information related to the request; and
wherein the selecting of the one or more modules is based on the obtained dynamic information.

3. The method of claim 2, wherein the dynamic information includes at least one of the following:
the user's demographic information;
the user's location;
the time of the user's input associated with the card;
the user's preferences regarding card modules; and
the user's behavior patterns.

4. The method claim 1, wherein a number of modules to be included in the card is determined based on user's interaction with previously generated cards.

5. The method of claim 1, wherein at least one of the one or more modules is selected based on information not related to any query, regardless whether a query is submitted by the user.

6. The method of claim 1, wherein the intent is estimated further based on a query submitted by the user, and/or contextual information in a data source associated with the user.

7. The method of claim 1, wherein the estimating further comprises:
receiving the input from the user at a location, wherein the input is indicative of an action,
identifying, based on the action, a list of multiple domains that are combinable with the action according to an intent space having multiple possible intents associated with the user,
selecting, based on the location, a domain from the list of multiple domains, and
estimating, based on the action and the selected domain, the intent of the user from the multiple possible intents.

8. A machine-readable, non-transitory and tangible medium having information recorded thereon for generating a card, when read by the machine, causes the machine to perform the following:
cross-linking, by one or more cross-linking keys, across a private space, a semi-private space, and a public space to create a person-centric space for a user, wherein the one or more cross-linking keys are identified from the private space;
receiving a request for a card to be generated for the user;
selecting, based on a type of the card, one set of module candidates from a plurality of different sets of module candidates;
estimating an intent of the user based on an input from the user and the person-centric space;
determining a plurality of additional module candidates based on the intent;
integrating the selected one set of module candidates and the plurality of additional module candidates;
selecting dynamically, from the integrated module candidates, one or more modules to be put into the card based on a type of device operated by the user;

determining, for each module, a location within the card where the module is to be placed based on a relationship of content included in the module with content included in other modules; and generating the card based on the selected one or more modules and the determined locations.

9. The medium of claim 8, further comprising:
obtaining, from the person-centric space, dynamic information related to the request; and
wherein the selecting of the one or more modules is based on the obtained dynamic information.

10. The medium of claim 9, wherein the dynamic information includes at least one of the following:
the user's demographic information;
the user's location;
the time of the user's input associated with the card;
the user's preferences regarding card modules; and
the user's behavior patterns.

11. The medium claim 8, wherein a number of modules to be included in the card is determined based on user's interaction with previously generated cards.

12. The medium of claim 8, wherein at least one of the one or more modules is selected based on information not related to any query, regardless whether a query is submitted by the user.

13. The medium of claim 8, wherein the intent is estimated based on a query submitted by the user, and/or contextual information in a data source associated with the user.

14. The medium of claim 8, wherein the estimating further comprises:
receiving the input from the user at a location, wherein the input is indicative of an action,
identifying, based on the action, a list of multiple domains that are combinable with the action according to an intent space having multiple possible intents associated with the user,
selecting, based on the location, a domain from the list of multiple domains, and
estimating, based on the action and the selected domain, the intent of the user from the multiple possible intents.

15. A system for generating a card, the system comprising:
at least one processor configured for:
cross-linking, by one or more cross-linking keys, across a private space, a semi-private space, and a public space to create a person-centric space for a user, wherein the one or more cross-linking keys are identified from the private space;
receiving a request for a card to be generated for the user;
selecting, based on a type of the card, one set of module candidates from a plurality of different sets of module candidates;
estimating an intent of the user based on an input from the user and the person-centric space;
determining a plurality of additional module candidates based on the intent;
integrating the selected one set of module candidates and the plurality of additional module candidates;
selecting dynamically, from the integrated module candidates, one or more modules to be put into the card based on a type of device operated by the user;
determining, for each module, a location within the card where the module is to be placed based on a relationship of content included in the module with content included in other modules; and
generating the card based on the selected one or more modules and the determined locations.

16. The system of claim 15, wherein the at least one processor is further configured for:
obtaining, from the person-centric space, dynamic information related to the request, and
wherein the selecting of the one or more modules is based on the obtained dynamic information.

17. The system of claim 16, wherein the dynamic information includes at least one of the following:
the user's demographic information;
the user's location;
the time of the user's input associated with the card;
the user's preferences regarding card modules; and
the user's behavior patterns.

18. The system claim 15, wherein a number of modules to be included in the card is determined based on user's interaction with previously generated cards.

19. The system of claim 15, wherein at least one of the one or more modules is selected based on information not related to any query, regardless whether a query is submitted by the user.

20. The system of claim 15, wherein the intent is estimated based on a query submitted by the user, and/or contextual information in a data source associated with the user.

* * * * *